United States Patent
Nakazawa et al.

(10) Patent No.: US 8,043,531 B2
(45) Date of Patent: Oct. 25, 2011

(54) SURFACE CONDITIONER AND SURFACE CONDITIONING METHOD

(75) Inventors: Toshiko Nakazawa, Tokyo (JP); Seiichiro Shirahata, Tokyo (JP)

(73) Assignee: Nippon Paint Co., Ltd., Osaka (JP)

( * ) Notice: Subject to any disclaimer, the term of this patent is extended or adjusted under 35 U.S.C. 154(b) by 828 days.

(21) Appl. No.: 11/996,820

(22) PCT Filed: Jul. 28, 2006

(86) PCT No.: PCT/JP2006/315055
§ 371 (c)(1),
(2), (4) Date: May 19, 2008

(87) PCT Pub. No.: WO2007/013626
PCT Pub. Date: Feb. 1, 2007

(65) Prior Publication Data
US 2010/0144945 A1    Jun. 10, 2010

(30) Foreign Application Priority Data

Jul. 29, 2005  (JP) .................................. 2005-221308
Jul. 29, 2005  (JP) ................................ P2005-221306
Jul. 29, 2005  (JP) ................................ P2005-221307

(51) Int. Cl.
*C23F 11/00* (2006.01)
*C23C 22/78* (2006.01)
*C04B 28/14* (2006.01)

(52) U.S. Cl. ................. 252/389.2; 252/387; 252/389.52; 524/423; 148/254

(58) Field of Classification Search .................. 524/423; 252/389.2, 387, 389.52; 148/254
See application file for complete search history.

(56) References Cited

U.S. PATENT DOCUMENTS

| | | | | |
|---|---|---|---|---|
| 3,898,037 A | * | 8/1975 | Lange et al. | 422/16 |
| 5,292,908 A | * | 3/1994 | Onikata et al. | 556/173 |
| 5,320,673 A | * | 6/1994 | Carpenter | 106/404 |
| 5,453,416 A | * | 9/1995 | Thevissen | 507/224 |

(Continued)

FOREIGN PATENT DOCUMENTS

CN    1446252    10/2003

(Continued)

OTHER PUBLICATIONS

English language Abstract of JP 2004-68149.

(Continued)

*Primary Examiner* — Michael M Bernshteyn
(74) *Attorney, Agent, or Firm* — Greenblum & Bernstein, P.L.C.

(57) ABSTRACT

The invention provides a surface conditioner which can prevent an aluminum alloy from stray current corrosion in chemical conversion treatment and reduce the difference between contact and noncontact areas in conversion coating build-up on an aluminum alloy and which enables the formation of excellent chemical conversion coatings on various metal materials and a surface conditioner which can prevent metal from rusting after surface conditioning and is excellent in dispersion stability in a treating bath. A surface conditioner to be applied prior to the phosphating of metal which contains (A) zinc phosphate particles having $D_{50}$ of 3 µm or below, (B) a water-soluble organic polymer, and (C) a layer clay mineral and has a pH of 3 to 12, characterized by further containing as the function imparting agent (D) a di- or tri-valent metal nitrite, zinc oxide and/or sodium hydroxide, or a nonionic or anionic surfactant.

10 Claims, 1 Drawing Sheet

U.S. PATENT DOCUMENTS

| | | |
|---|---|---|
| 6,214,132 B1 | 4/2001 | Nakayama et al. |
| 6,478,860 B1 | 11/2002 | Nakayama et al. |
| 7,462,582 B2 | 12/2008 | Komiyama et al. |
| 7,767,111 B2 * | 8/2010 | Nakazawa .................. 252/389.2 |
| 2003/0130139 A1 | 7/2003 | Komiyama et al. |
| 2004/0011429 A1 * | 1/2004 | Miyamoto et al. ............ 148/254 |
| 2004/0021429 A1 | 2/2004 | Shackle |
| 2005/0187326 A1 | 8/2005 | Nakazawa |
| 2006/0113005 A1 * | 6/2006 | Ando et al. ................... 148/254 |

FOREIGN PATENT DOCUMENTS

| | | |
|---|---|---|
| CN | 1470672 | 1/2004 |
| EP | 1 316 603 | 6/2003 |
| EP | 1 566 466 | 8/2005 |
| EP | 1 378 586 | 2/2007 |
| JP | 10-245685 | 9/1998 |
| JP | 11-171533 | 6/1999 |
| JP | 2000-96256 | 4/2000 |
| JP | 2001-262364 | 9/2001 |
| JP | 2004-68149 | 3/2004 |
| JP | 2006-183144 | 7/2006 |
| WO | 02/14458 | 2/2002 |

OTHER PUBLICATIONS

English language Abstract of JP 2006-183144.
English language Abstract of JP11-171533.
English language Abstract of JP10-245685.
English language Abstract of JP 2000-96256.
English language Abstract of JP2001-262364.

* cited by examiner

SURFACE CONDITIONER AND SURFACE CONDITIONING METHOD

TECHNICAL FIELD

The present invention relates to a surface conditioner and a surface conditioning method.

BACKGROUND ART

Automotive bodies and household electrical appliances and the like are produced by generating molded metal items from metal materials such as steel sheets, galvanized steel sheets and aluminum alloys, and then coating and assembling these items. Coating of these molded metal items is conducted via a number of steps including degreasing, surface conditioning, chemical conversion treatment, and electrodeposition coating.

The surface conditioning treatment is conducted to ensure that, in the subsequent phosphate coating chemical conversion treatment, a coating comprising phosphate crystals can be formed uniformly, rapidly, and with a high density across the entire surface of the metal, and the treatment usually comprises immersing the metal item in a surface conditioning bath in order to form phosphate crystal nuclei on the metal surface.

For example, Patent Reference 1 discloses a pretreatment liquid for conditioning a surface prior to a phosphate coating chemical conversion treatment, the liquid comprising at least one material selected from amongst phosphates containing at least one divalent or trivalent metal and including particles with a particle size of not more than 5 µm, an alkali metal salt or ammonium salt or a mixture thereof, and at least one material selected from the group consisting of anionically charged and dispersed fine oxide particles, anionic water-soluble organic polymers, nonionic water-soluble organic polymers, anionic surfactants and nonionic surfactants, and having a pH within a range from 4 to 13.

Furthermore, Patent Reference 2 discloses a pretreatment liquid for conditioning a surface prior to phosphate coating chemical conversion treatment, the liquid comprising one or more types of phosphate particles selected from amongst phosphates containing one or more divalent and/or trivalent metals, and further comprising (1) one or more materials selected from amongst monosaccharides, polysaccharides, and derivatives thereof, (2) one or more materials selected from amongst orthophosphoric acid, polyphosphoric acid or organic phosphonic acid compounds, and water-soluble polymer compounds comprising a vinyl acetate polymer, a derivative thereof, or a copolymer of vinyl acetate and another monomer that is copolymerizable with vinyl acetate, or (3) a polymer or copolymer obtained by polymerizing at least one compound selected from amongst specific monomers or $\alpha,\beta$-unsaturated carboxylic acid monomers, and not more than 50% by weight of another monomer that is copolymerizable with the above monomer.

Moreover, Patent Reference 3 discloses a method for surface treatment of an aluminum alloy malleable material, wherein the zeta potential is regulated.

However, when the surface conditioning treatment liquids disclosed in the Patent Reference 1 and the Patent Reference 2 are used, rust can sometimes develop following the surface conditioning, meaning further improvements are desirable.

Furthermore, with the surface conditioning treatment liquids disclosed in the Patent Reference 1 and the Patent Reference 2, in those areas where an aluminum alloy contacts a steel sheet or a galvanized steel sheet, the aluminum alloy portion becomes an anode and the steel sheet or galvanized steel sheet becomes a cathode, making formation of a chemical conversion coating on the aluminum alloy difficult. As a result, there is a demand for the development of a surface conditioner that is capable of suppressing electrolytic corrosion on an aluminum alloy during chemical conversion treatment.

Moreover, when the surface conditioning treatment liquids described above are used with aluminum alloys or metals such as high-tensile steel sheets, a satisfactory chemical conversion coating is not formed on the surface of the metal. Furthermore, when these surface conditioning treatment liquids are used, other problems also arise, including an inability to form a dense chemical conversion coating on a variety of metal materials, and the fact that because the particle size of the particles within the surface conditioning treatment liquids is large, the stability of the particles within the treatment bath tends to be unsatisfactory, causing ready precipitation of the particles.

Furthermore, even when surface conditioning using the treatment liquid disclosed in the Patent Reference 3 is conducted, it is unable to satisfactorily resolve the types of problems outlined above.

[Patent Reference 1] Japanese Patent Laid-Open No. H10-245685
[Patent Reference 2] Japanese Patent Laid-Open No. 2000-96256
[Patent Reference 3] Japanese Patent Laid-Open No. 2001-262364

DISCLOSURE OF INVENTION

Problems to be Solved by the Invention

The present invention takes the above circumstances into consideration, with an object of providing a surface conditioner that can prevent rust from occurring following surface conditioning, and exhibits excellent dispersion stability within a treatment bath.

Furthermore, another object of the present invention is to provide a surface conditioner that is capable of suppressing electrolytic corrosion on an aluminum alloy during chemical conversion treatment, is able to reduce the difference in the quantity of the chemical conversion coating formed on contact portions and general portions (non-contact portions) of an aluminum alloy, and enables the formation of favorable chemical conversion coatings on a variety of metal materials.

Means for Solving the Problems

The present invention is a surface conditioner with a pH of 3 to 12 that is used prior to phosphate conversion coating of a metal, the surface conditioner comprising (A) zinc phosphate particles for which $D_{50}$ is not more than 3 µm, (B) a water-soluble organic polymer, and (C) a laminar clay mineral, and further comprising (D) a function-imparting agent.

In a preferred aspect, the water-soluble organic polymer (B) is at least one polymer selected from the group consisting of:

(1) carboxylic acid group-containing copolymers obtainable by copolymerizing a monomer mixture comprising less than 50% by mass of at least one monomer selected from the group consisting of (meth)acrylic acid, maleic acid, maleic anhydride, itaconic acid and itaconic anhydride, and greater than 50% by mass of another monomer that is capable of copolymerization with the above carboxylic acid group-containing monomer, (2) phosphate esters represented by either a formula (I) shown below:

[Formula 1]

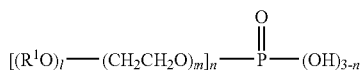

(wherein, $R^1$ represents an alkyl group or alkylphenol group of 8 to 30 carbon atoms, l represents either 0 or 1, m is from 1 to 20, and n represents 1, 2 or 3),
or a formula (II) shown below:

[Formula 2]

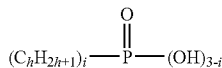

(wherein, h represents an integer from 2 to 24, and i represents either 1 or 2),
(3) polyester resins,
(4) phosphonic acid group-containing resins, and
(5) polyamine-based resins, and
the function-imparting agent (D) is a divalent or trivalent metal nitrite compound, and the quantity of that compound, calculated as an equivalent quantity of $NO_2$, is within a range from 10 to 500 ppm (a first surface conditioner).

Furthermore, in other preferred aspects, the water-soluble organic polymer (B) is a carboxylic acid group-containing copolymer obtainable by copolymerizing a monomer mixture comprising less than 50% by mass of at least one monomer selected from the group consisting of (meth)acrylic acid, maleic acid, maleic anhydride, itaconic acid and itaconic anhydride, and greater than 50% by mass of another monomer that is capable of copolymerization with the above carboxylic acid group-containing monomer (a second surface conditioner), and the function-imparting agent (D) is zinc oxide and/or sodium hydroxide, the zeta potential is not more than −50 mV, and the pH is within a range from 8 to 11 (a third surface conditioner).

Furthermore, in another preferred aspect, the water-soluble organic polymer (B) is a carboxylic acid group-containing copolymer obtainable by copolymerizing a monomer mixture comprising less than 50% by mass of at least one monomer selected from the group consisting of (meth)acrylic acid, maleic acid, maleic anhydride, itaconic acid and itaconic anhydride, and greater than 50% by mass of another monomer that is capable of copolymerization with the above carboxylic acid group-containing monomer, and the function-imparting agent (D) is a nonionic or anionic surfactant.

In yet another preferred aspect, the other monomer that is capable of copolymerization with the above carboxylic acid group-containing monomer comprises a sulfonic acid monomer and/or styrene.

In yet another preferred aspect, the carboxylic acid group-containing copolymer is obtainable by copolymerizing a monomer mixture comprising less than 50% by mass of (meth)acrylic acid, and more than 50% by mass of a combined mass of 2-(meth)acrylamido-2-methylpropanesulfonic acid and/or allylsulfonic acid.

The laminar clay mineral is preferably a natural hectorite and/or a synthetic hectorite.

The laminar clay mineral is preferably a material obtainable by surface treating bentonite with an alkyltrialkoxysilane represented by a formula (III) shown below:

[Formula 3]

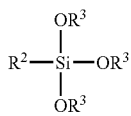

(wherein, $R^2$ represents a saturated alkyl group of 1 to 22 carbon atoms, and the $R^3$ groups may be the same or different, and each represent a methyl group, ethyl group, propyl group or butyl group).

The sulfonic acid group-containing resin preferably has a weight average molecular weight within a range from 3,000 to 20,000.

The nonionic surfactant preferably has an HLB value of 6 or greater.

The present invention also provides a surface conditioning method that comprises a step of bringing the above surface conditioner into contact with a metal surface.

In the surface conditioning method, the above step preferably comprises the adsorption of zinc phosphate in a quantity of Zn of at least 3 mg/m$^2$.

A more detailed description of the present invention is provided below.

By using a surface conditioner of the present invention for the surface conditioning that is conducted as a pretreatment prior to a phosphate conversion coating treatment, fine particles of zinc phosphate are bonded to the metal surface, and in the subsequent zinc phosphate chemical conversion treatment, the generation of a zinc phosphate coating in which the fine particles act as crystal nuclei is accelerated, enabling the formation of a favorable zinc phosphate coating. If this surface conditioner is used for a surface conditioning of a metal material, and the metal material is then subjected to chemical conversion treatment, fine phosphate crystals are deposited in a comparatively short time, enabling the entire surface of the metal to be covered.

By employing a basic configuration comprising (A) zinc phosphate particles for which $D_{50}$ is not more than 3 μm, (B) a water-soluble organic polymer, and (C) a laminar clay mineral, and further incorporating (D) a function-imparting agent, the surface conditioner of the present invention is able to resolve a variety of problems.

In a conventional surface conditioner comprising divalent or trivalent phosphate particles, because the particle size of the phosphate particles is large, the stability of the particles within the surface conditioning treatment bath tends to be unsatisfactory. As a result, a problem arises in that the phosphate particles are prone to precipitation. The surface conditioner of the present invention comprises zinc phosphate particles for which $D_{50}$ is not more than 3 μm, and as a result, the stability of the particles within the treatment bath is excellent, and precipitation of the zinc phosphate particles within the treatment bah can be suppressed.

In the surface conditioner of the present invention, in those cases where the water-soluble organic polymer (B) is at least one polymer selected from the group consisting of specific (1) carboxylic acid group-containing copolymers, (2) phosphate esters, (3) polyester resins, (4) phosphonic acid group-containing resins and (5) polyamine-based resins, and the function-imparting agent (D) is a divalent or trivalent metal nitrite compound wherein the quantity of that compound, calculated as an equivalent quantity of $NO_2$, is within a range from 10 to 500 ppm, use of the surface conditioner of the present invention for conducting surface conditioning of a variety of metal materials can prevent rust from occurring on those metal materials following surface conditioning. As a result, when surface conditioning of a variety of metal materials is conducted using the surface conditioner of the present invention, and a chemical conversion treatment is then conducted, a chemical conversion coating with superior performance can be formed.

The water-soluble organic polymer (B) functions as a dispersant, and by incorporating the above polymers, can also accelerate the chemical conversion process during chemical conversion treatment. Accordingly, a dense chemical conversion coating can be formed in the chemical conversion treatment, enabling the corrosion resistance to be improved. The reason why the use of a surface conditioner comprising these components should accelerate the chemical conversion treatment and enable the formation of a dense chemical conversion coating is not entirely clear, but is thought to reflect the fact that the terminals of these components adsorb readily to the substrate.

In the surface conditioner of the present invention, in those cases where the water-soluble organic polymer (B) is a specific carboxylic acid group-containing copolymer, and the function-imparting agent (D) is zinc oxide and/or sodium hydroxide, the zeta potential is not more than $-50$ mV, and the pH is within a range from 8 to 11, or the function-imparting agent (D) is a nonionic or anionic surfactant, the effects described below can be obtained.

An iron or zinc-based substrate and an aluminum-based substrate may be used as the metal material that is subjected to treatment with the surface conditioner, and this metal material may include areas where the iron or zinc-based substrate and the aluminum-based substrate make contact. If a chemical conversion treatment is conducted on these types of substrate, then during chemical conversion treatment, at the area of contact, the portion of the aluminum-based substrate becomes an anode, and the iron or zinc-based substrate becomes a cathode, and as a result, formation of a chemical conversion coating on the aluminum-based substrate portion at the area of contact becomes very difficult. It is thought that by increasing the quantity of adsorbed material on the treatment target, the surface conditioner of the present invention is able to accelerate the speed of chemical conversion, meaning that compared with conventional surface conditioners, electrolytic corrosion at the aluminum-based substrate portions of areas of contact between the iron or zinc-based substrate and the aluminum-based substrate can be suppressed. As a result, in those cases where a substrate that includes areas where an iron or zinc-based substrate and an aluminum-based substrate make contact is subjected to surface conditioning using the surface conditioner of the present invention, and subsequently undergoes a chemical conversion treatment, a chemical conversion coating can be formed favorably on those portions of the aluminum-based substrate at the areas of contact.

Furthermore, in those cases where a substrate that includes areas where an iron or zinc-based substrate and an aluminum-based substrate make contact is subjected to surface conditioning using the surface conditioner of the present invention, and subsequently undergoes a chemical conversion treatment, the difference in the chemical conversion coating quantity formed on those portions of the aluminum-based substrate that do not contact the iron or zinc-based substrate (the general portions), and those portions of the aluminum-based substrate that contact the iron or zinc-based substrate (the contact portions) can be reduced. As a result, by using the surface conditioner of the present invention, a more uniform chemical conversion coating can be formed on both the general portions and the contact portions of the aluminum-based substrate.

In those cases where a conventional surface conditioner comprising divalent or trivalent phosphate particles is applied to an aluminum-based substrate or a high-tensile steel sheet or the like, a chemical conversion coating with a satisfactory coating quantity can not be formed during the chemical conversion treatment, meaning a satisfactory level of corrosion resistance can not be imparted to these substrates. In contrast, in those cases where the surface conditioner of the present invention is used, a chemical conversion coating of satisfactory coating quantity can be formed during the chemical conversion treatment, even for aluminum-based substrates and high-tensile steel sheets and the like, meaning a satisfactory level of corrosion resistance can be imparted to these substrates.

Furthermore, in those cases where a variety of metal materials including iron-based substrates, zinc-based substrates, aluminum-based substrates or high-tensile steel sheets are subjected to surface conditioning using the surface conditioner of the present invention, and subsequently undergo a chemical conversion treatment, dense chemical conversion coatings can be formed on this variety of metal materials. Accordingly, the corrosion resistance can be improved for all manner of metal materials.

Furthermore, because the specific carboxylic acid group-containing copolymer described above belongs to the aforementioned water-soluble organic polymer (B) contained within the surface conditioner of the present invention, the copolymer is able to accelerate the chemical conversion process during chemical conversion treatment. As a result, a dense chemical conversion coating can be formed during the chemical conversion treatment, enabling the corrosion resistance to be improved.

Particularly in those cases where the function-imparting agent (D) is zinc oxide and/or sodium hydroxide, the zeta potential is not more than $-50$ mV, and the pH is within a range from 8 to 11, use of the above surface conditioner enables a favorable reduction in the process time as a result of a shorter treatment time.

Furthermore, by ensuring that the zeta potential is not more than $-50$ mV, the types of effects described above can be effectively achieved.

The reason why ensuring that the zeta potential of the above surface conditioner is not more than $-50$ mV should enable the types of effects described above to be effectively achieved is not entirely clear, but is thought to be due to the actions and functions described below.

It is thought that because the surface conditioner comprising the essential components described above has a zeta potential of not more than $-50$ mV, adsorption of the components within the surface conditioner to the substrate can be accelerated. It is believed that by maintaining the zeta potential at a value of not more than $-50$ mV, the repulsive force between component particles can be increased, thereby increasing the number of particles that can function effectively, and increasing the number of microcell formation sites on the surface of the substrate. It is thought that, as a result, a chemical conversion coating of satisfactory coating quantity can be formed on the contact portions of substrates that include areas where an iron or zinc-based substrate and an aluminum-based substrate make contact, and the difference in the chemical conversion coating quantity formed on the general portions and the contact portions can be reduced. Furthermore, it is also thought that the same actions and functions enable a dense chemical conversion coating to be formed on all manner of metal materials.

(A) Zinc Phosphate Particles

The surface conditioner of the present invention comprises (A) zinc phosphate particles for which $D_{50}$ is not more than 3 μm. By using zinc phosphate particles for which $D_{50}$ (the volume 50% diameter) is not more than 3 μm, a large quantity of crystal nuclei can be generated prior to the phosphate chemical conversion treatment, thereby enabling fine phosphate crystals to be deposited during a comparatively short chemical conversion treatment. In the specification of the present invention, the $D_{50}$ value represents the average dispersion diameter or the average particle size.

The lower limit for the $D_{50}$ value for the above zinc phosphate particles is preferably 0.01 μm, and the upper limit is preferably 3 μm. If $D_{50}$ is less than 0.01 μm, then particle aggregation may occur due to the phenomenon of excessive dispersion. If $D_{50}$ exceeds 3 μm, then the proportion of fine zinc phosphate particles decreases undesirably. The lower limit is even more preferably 0.05 μm, and the upper limit is even more preferably 1 μm.

The surface conditioner of the present invention preferably comprises zinc phosphate particles for which $D_{90}$ (the volume 90% diameter) is not more than 4 μm. In such a case, because the zinc phosphate particles not only have a $D_{50}$ value of not more than 3 μm, but also have a $D_{90}$ value of not more than 4 μm, the proportion of coarse particles within the zinc phosphate particles is comparatively small. As descried above, by using zinc phosphate particles with an average particle size ($D_{50}$) of not more than 3 μm, fine phosphate crystals can be deposited during a comparatively short chemical conversion treatment, but if a device such as a grinding mill is used to achieve a dispersion of not more than 3 μm, and excessive milling is conducted, then the resulting increase in the specific surface area can cause a shortage in the quantity of the component that functions as a dispersant, resulting in the phenomenon of excessive dispersion wherein the excessively dispersed particles undergo aggregation, which actually leads to the formation of coarse particles and a deterioration in the dispersion stability. Furthermore, the blending of the surface conditioner and the dispersion conditions can cause variations in the dispersibility, and the resulting closest packing of the coarse particles and fine particles causes aggregation and an increase in viscosity, and aggregation between fine particles may also occur. However, when the aforementioned zinc phosphate has a $D_{90}$ (volume 90% diameter) value of not more than 4 μm, the types of problems outlined above can be better prevented.

The lower limit for the $D_{90}$ value for the above zinc phosphate particles is preferably 0.01 μm, and the upper limit is preferably 4 μm. If $D_{90}$ is less than 0.01 μm, then particle aggregation may occur due to the phenomenon of excessive dispersion. If $D_{90}$ exceeds 4 μm, then the proportion of fine zinc phosphate particles decreases undesirably. The lower limit is even more preferably 0.05 μm, and the upper limit is even more preferably 2 μm.

The $D_{50}$ (the volume 50% diameter) and $D_{90}$ (the volume 90% diameter) values mentioned above are determined on the basis of the particle size distribution within the dispersion, by creating a cumulative curve in which the total volume of all the particles is 100%, and refer to the points where the cumulative volume reaches 50% and 90% respectively. The $D_{50}$ and $D_{90}$ values can be measured automatically using, for example, a particle size measurement apparatus such as a Laser Doppler particle size analyzer (Microtrac UPA150, manufactured by Nikkiso Co., Ltd.).

There are no particular restrictions on the zinc phosphate particles, provided the $D_{50}$ value is not more than 3 μm. Furthermore, a mixture of particles that satisfies the condition for a $D_{50}$ value of not more than 3 μm may also be used.

In the surface conditioner of the present invention, the quantity of the zinc phosphate particles preferably has a lower limit of 50 ppm and an upper limit of 20,000 ppm. If this quantity is less than 50 ppm, then the quantity of phosphate available for generating the crystal nuclei is inadequate, and there is a danger that a satisfactory surface conditioning effect may be unattainable. In contrast, even if the quantity exceeds 20,000 ppm, no improvement is obtained beyond a certain level of effect, and the surface conditioner becomes uneconomic. The lower limit is even more preferably 150 ppm, and the upper limit is even more preferably 10,000.

(B) Water-Soluble Organic Polymer

The surface conditioner of the present invention also comprises a water-soluble organic polymer (B). In the case of the first surface conditioner of the present invention, the water-soluble organic polymer (B) is at least one polymer selected from the group consisting of (1) carboxylic acid group-containing copolymers, (2) phosphate esters, (3) polyester resins, (4) phosphonic acid group-containing resins and (5) polyamine-based resins. Furthermore, in the second and third surface conditioners of the present invention, the water-soluble organic polymer (B) is a carboxylic acid group-containing copolymer, and this copolymer is the same as the carboxylic acid group-containing copolymer (1). Descriptions of each of the above polymers are provided below.

<(1) Carboxylic Acid Group-Containing Copolymer>

A specific carboxylic acid group-containing copolymer that represents one possibility for the above water-soluble organic polymer is a carboxylic acid group-containing copolymer obtainable by copolymerizing a monomer composition comprising less than 50% by mass of at least one carboxylic acid group-containing monomer selected from the group consisting of (meth)acrylic acid, maleic acid, maleic anhydride, itaconic acid and itaconic anhydride, and greater than 50% by mass of another monomer that is capable of copolymerization with the above carboxylic acid group-containing monomer. By using a carboxylic acid group-containing copolymer obtained using the specific blend quantities of the specific monomers described above, the aforementioned effects of the present invention can be achieved.

Although there are no particular restrictions on the aforementioned other monomer that is capable of copolymerization with the above carboxylic acid group-containing monomer, using a sulfonic acid monomer and/or a styrene is preferred in terms of achieving more effective prevention of rust following surface conditioning.

There are no particular restrictions on the above sulfonic acid monomer provided it contains a sulfonic acid group, and examples include sulfonic acid group-containing (meth)acrylamides such as 2-(meth)acrylamido-2-methylpropanesulfonic acid, 3-(meth)acrylamidopropane-1-sulfonic acid, 2-(meth)acrylamidoethyl-1-sulfonic acid, 3-(meth)acrylamido-2-hydroxypropanesulfonic acid, and p-(meth)acrylamidomethylbenzenesulfonic acid; aromatic hydrocarbon vinylsulfonic acids such as styrenesulfonic acid, styrenedisulfonic acid, α-methylstyrenesulfonic acid, and vinylphenylmethanesulfonic acid; sulfonic acid group-containing (meth) acrylates such as 3-(meth)acryloyloxypropane-1-sulfonic acid, 4-(meth)acryloyloxybutane-2-sulfonate, 2-(meth)acryloyloxyethyl-1-sulfonic acid, and 3-(meth)acryloyloxy-2-hydroxypropanesulfonic acid; aliphatic hydrocarbon vinylsulfonic acids such as vinylsulfonic acid and (meth)allylsulfonic acid; as well as salts of the above acids.

Examples of the above salts include the salts of alkali metals such as sodium and potassium, ammoniums salts, and ammonium salts that have been substituted with organic group(s) such as methylamine, ethylamine, dimethylamine, diethylamine and triethylamine. These sulfonic acid group-containing monomers may be used either alone, or in combinations of two or more different monomers.

The above carboxylic acid group-containing copolymer is preferably a polymer obtainable by copolymerizing a monomer composition that contains (meth)acrylic acid, and at least one monomer selected from the group consisting of 2-(meth) acrylamido-2-methylpropanesulfonic acid, allylsulfonic acid, styrene and styrenesulfonic acid.

Of such copolymers, the carboxylic acid group-containing copolymer is preferably a polymer obtainable by copolymerizing a monomer composition that contains less than 50% by mass of (meth)acrylic acid, and more than 50% by mass of a combined quantity of 2-(meth)acrylamido-2-methylpropanesulfonic acid and/or allylsulfonic acid.

When one of the above preferred carboxylic acid group-containing copolymers is used, a chemical conversion coating can be formed more favorably on an aluminum-based substrate at contact portions where an iron or zinc-based substrate and the aluminum-based substrate make contact, and the difference in the chemical conversion coating quantity formed on the general portions and the contact portions can be reduced. Furthermore, a dense chemical conversion coating can be formed on a variety of metal materials. Moreover, chemical conversion coatings with a satisfactory coating quantity can also be formed on aluminum-based substrates and high-tensile steel sheets and the like.

The above carboxylic acid group-containing copolymer can be formed easily using conventional methods, for example by conducting a copolymerization of a monomer composition comprising (meth)acrylic acid, maleic acid, maleic anhydride, itaconic acid or itaconic anhydride, and another monomer that is capable of copolymerization with the carboxylic acid group-containing monomer, using a polymerization initiator such as a peroxide.

Furthermore, the above carboxylic acid group-containing copolymer may also be a hydrolysis product of a copolymer obtained in the manner described above. This hydrolysis product is a product in which, when maleic anhydride or itaconic anhydride is used, the maleic anhydride units or itaconic anhydride units have been hydrolyzed and converted to maleic acid units or itaconic acid units respectively. Salts of copolymers obtained in this manner are also suitable. Examples of these salts include structures in which the (meth) acrylic acid units, maleic acid units and/or itaconic acid units have formed salts, and examples of these salts include alkali metal salts such as lithium salts, sodium salts and potassium salts, alkaline earth metal salts such as magnesium salts and calcium salts, ammonium salts, and organic amine salts.

Examples of the above organic amine salts include aliphatic and aromatic monoamine salts such as methylamine salts, ethylamine salts, propylamine salts, butylamine salts, amylamine salts, hexylamine salts, octylamine salts, 2-ethylhexylamine salts, decylamine salts, dodecylamine salts, isotridecylamine salts, tetradecylamine salts, hexadecylamine salts, isohexadecylamine salts, octadecylamine salts, isooctadecylamine salts, octyldodecylamine salts, docosylamine salts, decyltetradecylamine salts, oleylamine salts, linolamine salts, dimethylamine salts, trimethylamine salts and aniline salts; polyamine salts such as ethylenediamine salts, tetramethylenediamine salts, dodecyl-propylenediamine salts, tetradecyl-propylenediamine salts, hexadecyl-propylenediamine salts, octadecyl-propylenediamine salts, oleyl-propylenediamine salts, diethylenetriamine salts, triethylenetetramine salts, tetraethylenepentamine salts and pentaethylenehexamine salts; alkanolamine salts such as monoethanolamine salts, diethanolamine salts, triethanolamine salts, monoisopropanolamine salts, diisopropanolamine salts, triisopropanolamine salts, salts of the alkylene oxide adducts of the above alkanolamines, and salts of the alkylene oxide adducts of primary or secondary amines; and amino acid salts such as lysine salts and arginine salts. Of the various salts, alkali metal salts, ammonium salts and alkanolamine salts are preferred.

Examples of commercially available products that can be used as the aforementioned carboxylic acid group-containing copolymer include Aron A6020 (manufactured by Toagosei Co., Ltd.), A-221M (manufactured by Japan Polyethylene Corporation), Polystar OM and Polystar OMA (manufactured by NOF Corporation), EFKA-4550 (manufactured by Efka Additives, Inc.), PX1ELK-100 (manufactured by Nippon Shokubai Co., Ltd.), Malialim AKM0531 (manufactured by NOF Corporation), SMA1440H (manufactured by Sartomer Company, Inc.), and Joncryl 60 (manufactured by Johnson Polymer, Inc.).

In the above carboxylic acid group-containing copolymer, the quantity of the one or more monomers selected from the group consisting of (meth)acrylic acid, maleic acid, maleic anhydride, itaconic acid and itaconic anhydride (or the combined quantity of these monomers) is less than 50% by mass within 100% by mass of the monomer composition. If this quantity is 50% by mass or higher, then the concentrate is prone to an increase in viscosity upon dispersion. Furthermore, in the first surface conditioner of the present invention, there is a danger that rust may not be able to be satisfactorily prevented following the surface conditioning treatment. Moreover, in the second and third surface conditioners of the present invention, a chemical conversion coating may not be able to be formed favorably on an aluminum-based substrate at contact portions where an iron or zinc-based substrate and the aluminum-based substrate make contact, and there is a danger that the difference in the chemical conversion coating quantity formed on the general portions and the contact portions may become overly large. Furthermore, dense chemical conversion coatings may not be able to be formed on a variety of metal materials, and chemical conversion coatings with a satisfactory coating quantity may not be able to be formed on aluminum-based substrates and high-tensile steel sheets. The lower limit for the above quantity is preferably 20% by mass, and is even more preferably 25% by mass. The upper limit for the quantity is even more preferably 45% by mass, and is even more preferably 40% by mass.

In the above carboxylic acid group-containing copolymer, the quantity of the other monomer that is capable of copolymerization with the above carboxylic acid group-containing monomer (or the combined quantity of these other monomers) exceeds 50% by mass of the 100% by mass of the monomer composition. If this quantity is 50% by mass or lower, then in the first surface conditioner of the present invention, there is a danger that rust may not be able to be satisfactorily prevented following the surface conditioning treatment. Moreover, in the second and third surface conditioners of the present invention, a chemical conversion coating may not be able to be formed favorably on an aluminum-based substrate at contact portions where an iron or zinc-based substrate and the aluminum-based substrate make contact, and there is a danger that the difference in the chemical conversion coating quantity formed on the general portions and the contact portions may become overly large. Furthermore, dense chemical conversion coatings may not be able to be formed on a variety of metal materials, and chemical conversion coatings with a satisfactory coating quantity may not be able to be formed on aluminum-based substrates and high-tensile steel sheets. The lower limit for the above quantity is preferably 55% by mass, and is even more preferably 60% by mass. The upper limit for the quantity is preferably 80% by mass, and is even more preferably 75% by mass.

The acid value for the above carboxylic acid group-containing copolymer (represented by the number of mg of potassium hydroxide required to neutralize the acid component within a 1 g sample) preferably has a lower limit of 100 and an upper limit of 900. If the acid value is less than 100, then there is a danger that the dispersibility of the zinc phosphate particles may deteriorate. Even if the acid value exceeds 900, no changes in the effects are observed. The lower limit is even more preferably 200, and the upper limit is even more preferably 800.

The weight average molecular weight of the carboxylic acid group-containing copolymer preferably has a lower limit of 1,000 and an upper limit of 30,000. If the weight average molecular weight is less than 1,000, then a satisfactory dispersion effect may not be obtainable. If the weight average molecular weight exceeds 30,000, then not only is a satisfactory dispersion effect unobtainable, but there is also an increased danger of aggregation. The lower limit is even more preferably 2,000, and the upper limit is even more preferably 20,000.

<(2) Phosphate Ester>

A specific phosphate ester that represents one possibility for the above water-soluble organic polymer is a compound represented by either the above formula (I) or the above formula (II). By using this type of phosphate ester, the aforementioned effects of the present invention can be achieved.

In a phosphate ester represented by the above formula (I), the group $R^1$ represents an alkyl group or alkylphenol group in which the number of carbon atoms has a lower limit of 8 and an upper limit of 30. The value of l is either 0 or 1. The value of m has a lower limit of 1 and an upper limit of 20. The value of n is 1, 2 or 3. The alkyl group or alkylphenol group represented by $R^1$ may be either a straight-chain or branched group.

Of the phosphate esters represented by the above formula (I), phosphate monoesters and phosphate diesters in which $R^1$ represents an isotridecyl group, l represents 1, m is within a range from 3 to 15, and n represents either 1 or 2 are preferred. When these phosphate esters are used, the occurrence of rust following surface conditioning can be effectively prevented.

In a phosphate ester represented by the above formula (II), h is an integer with a lower limit of 2 and an upper limit of 24. The value of i is either 1 or 2. The saturated alkyl group represented by $C_hH_2h+1$ in the formula (II) may be either a straight-chain or branched group.

Of the phosphate esters represented by the above formula (II), 2-ethylhexyl acid phosphates in which h represents 8 and i represents either 1 or 2 are preferred. By using these phosphates, the occurrence of rust following surface conditioning can be effectively prevented.

Examples of commercially available products of the phosphate esters represented by the formula (I) and the formula (II) include, for example, Phosphanol RS-410 and Phosphanol RS-610 (manufactured by Toho Chemical Industry Co., Ltd.), EXQ-2300 (manufactured by Kusumoto Chemicals, Ltd.), and JP-508 (manufactured by Johoku Chemical Co., Ltd.)

<(3) Polyester Resin>

A polyester-based resin that represents one possibility for the above water-soluble organic polymer is a synthetic organic polymer based on a polyester-based resin that exhibits a dispersion effect. By using this type of polyester-based resin, the aforementioned effects of the present invention can be achieved. In the present invention, polyester-based resins with these types of effects can be used without any particular restrictions.

The weight average molecular weight of the polyester-based resin is preferably within a range from 2,000 to 20,000. Provided the weight average molecular weight falls within this range, the occurrence of rust following surface conditioning can be effectively prevented. In the specification of the present invention, the weight average molecular weight refers to a value determined by a GPC method, using styrene polymers as standards.

Examples of commercially available products of the above polyester-based resins include Ajisper PB821 (manufactured by Ajinomoto Co., Inc.), Solsperse 24000GR (manufactured by the Zeneca Group), Solsperse 32550 (manufactured by the Zeneca Group), and Disperbyk 190 (manufactured by BYK-Chemie GmbH).

<(4) Phosphonic Acid Group-Containing Resin>

A phosphonic acid group-containing resin that represents one possibility for the above water-soluble organic polymer is a resin that contains phosphonic acid groups as functional groups. By using this type of phosphonic acid group-containing resin, the aforementioned effects of the present invention can be achieved. Examples of the phosphonic acid group-containing resin include resins that contain phosphonic acid groups that include a non-esterified hydroxyl group.

In the phosphonic acid group-containing resin, the acid value due to the phosphonic acid groups is preferably within a range from 5.0 to 50. Provided the acid value falls within this range, the occurrence of rust following surface conditioning can be effectively prevented. The acid value is even more preferably within a range from 10 to 35.

There are no particular restrictions on the phosphonic acid group-containing resin, provided it contains phosphonic acid groups as functional groups, and examples include acrylic-based resins, polyester-based resins obtained by condensation of a polyhydric alcohol and a polybasic acid or polyester-based resins produced by further condensation with a fatty acid, and polyurethane-based resins obtained by bonding a polyol with an isocyanate. Of these, a polyester-based resin obtained by condensation of a polyhydric alcohol and a polybasic acid is preferred in terms of effectively preventing the occurrence of rust following surface conditioning.

The weight average molecular weight of the phosphonic acid group-containing resin is preferably within a range from 3,000 to 20,000. Provided the weight average molecular weight falls within this range, the occurrence of rust following surface conditioning can be effectively prevented.

Examples of commercially available products of the above phosphonic acid group-containing resins include SN-Dispersant 2060 (manufactured by San Nopco Ltd.) and Chelest pH-325 (manufactured by Chelest Corporation).

<(5) Polyamine-Based Resin>

A polyamine-based resin that represents one possibility for the above water-soluble organic polymer is a resin that contains amino groups as functional groups. By using this type of polyamine-based resin, the aforementioned effects of the present invention can be achieved. Examples of the polyamine-based resin include, for example, resins that contain, within at least a portion of the resin, structural units represented by a formula (IV) and/or formula (V) shown below.

[Formula 4]

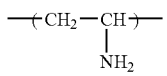
(IV)

[Formula 5]

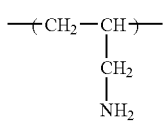
(V)

There are no particular restrictions on the method used for producing the polyamine-based resin, and production can be conducted using conventional methods. The polyamine-based resin is preferably a polyvinylamine resin that is a polymer formed solely from structural units represented by the above general formula (IV), and/or a polyvinylamine resin that is a polymer formed solely from structural units represented by the above general formula (V). These polyvinylamine resins and polyallylamine resins are preferred as they enable further improvements in the effects of the present invention.

Provided there is no impairment of the effects of the present invention, resins in which a portion of the amino groups within the aforementioned polyvinylamine resins and/or polyallylamine resins have been modified using an acetylation method or the like, resins in which a portion of, or all of, the amino groups have been neutralized using an acid, and resins that have undergone cross-linking using a cross-linking agent at a level that does not impair the solubility can also be used as the above polyamine-based resin.

The polyamine-based resin preferably contains not less than 0.01 mols and not more than 2.3 mols of amino groups per 100 g of the resin. If this quantity is less than 0.01 mols, then satisfactory effects may not be obtainable. Even if the quantity exceeds 2.3 mols, no changes in the effects are observed. The lower limit is even more preferably 0.1 mols.

The weight average molecular weight of the polyamine-based resin preferably has a lower limit of 500 and an upper limit of 100,000. Provided the weight average molecular weight falls within this range, the occurrence of rust following surface conditioning can be effectively prevented. The lower limit is even more preferably 5,000, and the upper limit is even more preferably 70,000.

Examples of commercially available products of the above polyamine-based resins include Unisence CP-102 (manufactured by Senka Company) and KZ-125K (manufactured by Senka Company). Furthermore, examples of commercially available products of the above polyvinylamine resins include PVAM-0595B (manufactured by Mitsubishi Chemical Corporation). Examples of commercially available products of the above polyallylamine resins include PAA-01, PAA-10C, PAA-H-10C and PAA-D11HCl (all manufactured by Nitto Boseki Co., Ltd.). These resins may be used either alone, or in combinations of two or more different resins.

In the first surface conditioner of the present invention, of the water-soluble organic polymers described above, the use of a carboxylic acid group-containing copolymer, phosphate ester, polyester-based resin or polyamine-based resin is preferred in terms of enabling effective prevention of rust following surface conditioning, and the use of a carboxylic acid group-containing copolymer is particularly desirable. In the second and third surface conditioners of the present invention, the water-soluble organic polymer is a carboxylic acid group-containing copolymer.

The quantity of the water-soluble organic polymer within a surface conditioner of the present invention preferably has a lower limit of 1 ppm and an upper limit of 500 ppm. If the quantity is less than 1 ppm, then the dispersive action is inadequate, and there is a danger that the particle size of the zinc phosphate particles may increase and the stability of the dispersion may decrease, meaning precipitation is more likely. If the quantity exceeds 500 ppm, then adsorption to the metal surface may occur, which can have an effect on the subsequent chemical conversion process. The lower limit is even more preferably 10 ppm, and the upper limit is even more preferably 300 ppm. In the first surface conditioner, the quantity of the water-soluble organic polymer refers to the combined quantity of the aforementioned carboxylic acid group-containing copolymer, phosphate ester, polyester-based resin, phosphonic acid group-containing resin, and polyamine-based resin.

(C) Laminar Clay Mineral

The surface conditioner of the present invention comprises a laminar clay mineral (C). Including this component enables the effects of the present invention described above to be achieved. The laminar clay mineral (clay) is a silicate mineral or the like with a laminar structure, in which a plurality of sheets (such as tetrahedral sheets formed from silicic acid, and octahedral sheets that further comprise Al or Mg or the like) have been layered together. Including this laminar clay mineral not only yields the effects described above, but also enables the dispersion efficiency to be improved during preparation of the surface conditioner.

There are no particular restrictions on the laminar clay mineral, and examples include smectite group minerals such as montmorillonite, beiderite, saponite and hectorite; kaolinite group minerals such as kaolinite and hallosite; vermiculite group minerals such as dioctahedral vermiculite and trioctahedral vermiculite; micas such as taeniolite, tetrasilicic mica, muscovite, illite, sericite, phlogopite and biotite; hydrotalcite; pyrophyllite; and laminar polysilicates such as kanemite, makatite, ilerite, magadiite and kenyaite. These laminar clay minerals may be natural minerals or may be synthetic minerals formed by hydrothermal synthesis, a fusion method, or a solid phase method.

Furthermore, intercalation compounds of the above laminar clay minerals (such as pillared crystals and the like), and materials produced by ion exchange treatment or surface treatment (such as a silane coupling treatment or a complexing treatment with an organic binder) of the above laminar clay minerals can also be used. These laminar clay minerals may be used either alone, or in combinations of two or more different materials.

The laminar clay mineral preferably has an average particle size (=the average value of the maximum dimensions) that is not more than 5 μm, and is even more preferably not more than 1 μm. If the average particle size exceeds 5 μm, then the dispersion stability may deteriorate. Furthermore, the average aspect ratio (=the average value of maximum dimension/minimum dimension) for the laminar clay mineral is preferably at least 10, even more preferably at least 20, and is most preferably 40 or greater. If this aspect ratio is less than 10, then the dispersion stability may deteriorate.

The laminar clay mineral is preferably a natural hectorite and/or a synthetic hectorite. By using a hectorite, a chemical conversion coating can be formed more favorably on an aluminum-based substrate at contact portions where an iron or zinc-based substrate and the aluminum-based substrate make contact, and the difference in the chemical conversion coating quantity formed on the general portions and the contact portions can be reduced. Furthermore, a dense chemical conversion coating can be formed on all manner of metal materials. Moreover, chemical conversion coatings with a satisfactory coating quantity can also be formed on aluminum-based substrates and high-tensile steel sheets. In addition, the hectorite imparts excellent dispersion stability, meaning the dispersion efficiency can also be improved.

The natural hectorite mentioned above is a trioctahedral clay mineral belonging to the montmorillonite group, represented by a formula (VI) shown below.

[Formula 6]

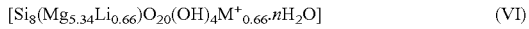

$$[Si_8(Mg_{5.34}Li_{0.66})O_{20}(OH)_4M^+{}_{0.66} \cdot nH_2O] \qquad (VI)$$

Commercially available products of the above natural hectorite include BENTON EW and BENTON AD (manufactured by Elementis plc).

The synthetic hectorite mentioned above has a three layer crystal structure, is similar to a hectorite that belongs to an unlimited layer expansion-type trioctahedral having an expansion lattice, and can be represented by a formula (VII) shown below.

[Formula 7]

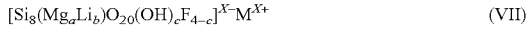

$$[Si_8(Mg_aLi_b)O_{20}(OH)_cF_{4-c}]^{X-}M^{X+} \qquad (VII)$$

(In the formula, $0<a\leqq6$, $0<b\leqq6$, $4<a+b<8$, $0\leqq c<4$, and x=12−2a−b. Furthermore, M is almost entirely Na.) The synthetic hectorite comprises magnesium, silicon and sodium as the primary components, and also comprises traces of lithium and fluorine.

The synthetic hectorite is a three layer structure, and each layer of the crystal structure within the laminar structure comprises a two dimensional platelet with a thickness of approximately 1 nm. A portion of the magnesium atoms that exist within the middle layer of this platelet unit are isomorphically substituted with lower valence lithium atoms, meaning the platelet unit is negatively charged. In a dried state, this negative charge is counterbalanced by displaceable cations that exist outside the lattice structure of the plate surface, and in a solid phase, these particles are bonded together by van der Waals forces, forming a bundle of flat plates.

When this type of synthetic hectorite is dispersed in a water phase, the displaceable cations become hydrated causing particle swelling, and a stable sol can be generated by dispersing the particles using a typical dispersion device such as a high-speed dissolver. In this type of water-dispersed state, the surfaces of the platelets adopt a negative charge and therefore undergo mutual electrostatic repulsion, thereby forming a stable sol in which fine dispersion occurs down to the primary particle level of the platelets. However, if the particle concentration or the ion concentration is increased, then the repulsive forces caused by the negative charges on the platelet surfaces tend to decrease, and the positively charged end portion of one platelet can align electrically with the negatively charged surface of another platelet, forming a so-called card house structure that causes an increase in the viscosity.

Examples of commercially available synthetic hectorites include the B, S, RD, RDS, XLG and XLS products produced by Laporte Industries Ltd. under the Laponite brand name. These products are white powders, and readily form either sols (in the case of Laponite S, RDS and XLS) or gels (in the case of Laponite B, RD and XLG) upon addition to water. An additional example is the product Lucentite SWN manufactured by Co-op Chemical Co., Ltd. These natural hectorites and synthetic hectorites may be used either alone, or in combinations of two or more different materials.

The laminar clay mineral is preferably a bentonite (montmorillonite) that has been subjected to surface treatment with an alkyltrialkoxysilane represented by the above formula (III). This enables the effects described above to be effectively achieved. Furthermore, the dispersion efficiency can also be improved. The groups $R^3$ within the above formula (III) may be either straight-chain or branched structures.

The surface treatment of the bentonite (montmorillonite) with an alkyltrialkoxysilane involves the addition of the alkyltrialkoxysilane to hydrophilic hydroxyl groups on the surface of the purified bentonite, thereby achieving a partial hydrophobic conversion of the surface. As a result, the dispersed particles of the surface-treated bentonite within the aqueous dispersion system form a plastic structure via association through the hydrophobic groups, thereby dramatically increasing the apparent viscosity of the system.

An example of a commercially available product of the aforementioned bentonite (montmorillonite) that has been subjected to surface treatment with an allyltrialkoxysilane represented by the above formula (III) is the product Bengel-SH (manufactured by Hojun Co., Ltd.).

The above Bengel-SH product forms a patchwork structure such as that shown in FIG. 1, which is different from the card house structure that a conventional montmorillonite forms in water. Because this patchwork structure is a structure in which montmorillonite laminar crystal particles are associated within a plane, the structure is able to exhibit an extremely high viscosity and particularly superior thixotropic properties within a surface conditioner of the present invention. In other words, of the aforementioned bentonites (montmorillonites) that have been subjected to surface treatment with an alkyltrialkoxysilane represented by the above formula (III), those having this type of patchwork structure yield superior levels of the above effects, and are consequently particularly desirable.

The quantity of the above laminar clay mineral within the surface conditioner preferably has a lower limit of 3 ppm and an upper limit of 600 ppm. If this quantity is less than 3 ppm, then the precipitation prevention effect for the zinc phosphate particles within the surface conditioner may be inadequate. Furthermore, the effects of the present invention may be unobtainable. If the quantity exceeds 600 ppm, then adsorption to the metal surface may occur, which can have an effect on the subsequent chemical conversion process. The lower limit is even more preferably 10 ppm, and the upper limit is even more preferably 300 ppm.

(D) Function-Imparting Agent

In addition to the components (A) through (C) described above, the surface conditioner of the present invention also comprises a function-imparting agent (D). Including such function-imparting agents enables all manner of issues to be resolved.

<Metal Nitrite Compound>

A function-imparting agent in the first surface conditioner of the present invention is a divalent or trivalent metal nitrite compound, and the quantity of that compound, calculated as an equivalent quantity of $NO_2$, is within a range from 10 to 500 ppm.

Because surface conditioning is typically conducted on a clean metal surface that has undergone degreasing and washing with water, problems such as oxidation and corrosion of the metal surface may occur during the surface conditioning step, but if a divalent or trivalent metal nitrite compound is added, then the occurrence of rust on the metal surface following surface conditioning can be suppressed. Furthermore, because rust can be suppressed, the chemical conversion properties achieved during the chemical conversion treatment can be improved significantly.

There are no particular restrictions on the above divalent or trivalent metal nitrite compound, provided it is a nitrite compound that contains a divalent or trivalent metal, and examples include zinc nitrite, copper nitrite, nickel nitrite, and alkaline earth metal nitrites such as magnesium nitrite, calcium nitrite, strontium nitrite and barium nitrite. Of these, zinc nitrite and calcium nitrite are preferred, and zinc nitrite is particularly desirable. If zinc nitrite is used during surface conditioning, then during formation of a zinc phosphate chemical conversion coating during the chemical conversion treatment, accumulation of a different metal within the chemical conversion treatment bath can be prevented, thereby simplifying control of the chemical conversion liquid within the bath. Furthermore, rusting of the metal surface following surface conditioning can be suppressed particularly favorably. These metal nitrite compounds may be used either alone, or in combinations of two or more different compounds.

The quantity of the above divalent or trivalent metal nitrite compound, calculated as an equivalent quantity of $NO_2$, preferably has a lower limit of 10 ppm and an upper limit of 500 ppm. Provided the quantity is within this range, the occurrence of rust following surface conditioning can be effectively prevented. If the quantity is less than 10 ppm, then favorable rust prevention and metal substitution may not be observed. If the quantity exceeds 500 ppm, a large quantity of an alkali component must be added to the surface conditioner, which is uneconomic. The lower limit is even more preferably 40 ppm, and the upper limit is even more preferably 250 ppm.

Furthermore, in the second and third surface conditioners of the present invention, a divalent or trivalent metal nitrite compound may be added with the expectation of achieving similar effects to those obtained for the first surface conditioner. In such cases, the details relating to the addition of the divalent or trivalent metal nitrite compound are the same as those described for the first surface conditioner.

<Zeta Potential Modifier>

In the second surface conditioner of the present invention, which has a zeta potential of not more than −50 mV, although the zeta potential may be modified by suitable selection of the zinc phosphate particles, the carboxylic acid group-containing copolymer and the laminar clay mineral, zinc oxide and/or sodium hydroxide is preferably added as a zeta potential modifier.

The zeta potential described above is known in the fields of colloid science and the like, due to publications such as "Zeta Potential: The physical chemistry of fine particle interfaces" (published by Scientist Inc., Jan. 31, 1995), and is a value that represents the charged state at the surface of a substance (a solid) within a solution, such as colloid particles. Specifically, in fields such as paper pulp, photography, coatings, oils and fats and cement, the state of aggregation or dispersion within each colloidal solution is determined by measuring the zeta potential of the colloid particles, which enables a variety of properties of these solutions to be evaluated.

The zeta potential of a surface conditioner of the present invention refers to a value obtained using a measurement apparatus "PALS Zeta Potential Analyzer Ver. 2.14" (manufactured by Brookhaven Instruments Corporation), under the measurement conditions listed below.

[Measurement Conditions]
(Measurement Parameters)
  Zeta Potential Model=Smoluchowsky
  Liquid=Aqueous
  Temperature=20.0° C.
  Viscosity=1.002 cP
  Refractive Index=1.331
(Instrument Parameters)
  Sample Count Rate=703 kcps
  Ref. Count Rate=1430 kcps
  Wavelength=675.0 nm
  Field Frequency=3.00 Hz
  Voltage=3.00 volts
  Electric Field=4.20 V/cm By including zinc oxide (ZnO) in the second surface conditioner of the present invention, the zeta potential of the surface conditioner can be readily modified to a desired value, and consequently a chemical conversion coating can be formed more favorably on an aluminum-based substrate at contact portions where an iron or zinc-based substrate and the aluminum-based substrate make contact, and the difference in the chemical conversion coating quantity formed on the general portions and the contact portions can be reduced. Furthermore, a dense chemical conversion coating can be formed on all manner of metal materials. Moreover, chemical conversion coatings with a satisfactory coating quantity can also be formed on aluminum-based substrates and high-tensile steel sheets.

The above zinc oxide is preferably included in the form of particles. The zinc oxide particles preferably have an average particle size specified by $D_{50}$ (the volume 50% diameter) of not more than 3 μm. By using zinc oxide particles for which the $D_{50}$ value is not more than 3 μm, the effects of the present invention can be effectively achieved.

The $D_{50}$ value for the above zinc oxide particles preferably has a lower limit of 0.01 μm and an upper limit of 3 μm. Provided the $D_{50}$ value is within this range, the effects of the present invention can be achieved more effectively. The lower limit is even more preferably 0.05 μm, and the upper limit is even more preferably 1 μm. The $D_{50}$ value for the above zinc oxide particles is determined in the same manner as that described above for the $D_{50}$ value for the aforementioned zinc phosphate particles.

The quantity used of the above zinc oxide particles preferably has a lower limit of 0.5 ppm and an upper limit of 200 ppm. Provided the quantity is within this range, the effects of the present invention can be favorably achieved. The lower limit is even more preferably 1 ppm, and the upper limit is even more preferably 100 ppm.

On the other hand, by including sodium hydroxide in the second surface conditioner of the present invention, the zeta potential of the surface conditioner can be readily modified to a desired value, and consequently a chemical conversion coating can be formed more favorably on an aluminum-based substrate at contact portions where an iron or zinc-based substrate and the aluminum-based substrate make contact, and the difference in the chemical conversion coating quantity formed on the general portions and the contact portions can be reduced. Furthermore, a dense chemical conversion coating can be formed on all manner of metal materials. Moreover, chemical conversion coatings with a satisfactory coating quantity can also be formed on aluminum-based substrates and high-tensile steel sheets.

The quantity used of the sodium hydroxide preferably has a lower limit of 3 ppm and an upper limit of 500 ppm. Provided the quantity is within this range, the effects of the present invention can be favorably achieved. The lower limit is even more preferably 5 ppm, and the upper limit is even more preferably 300 ppm.

<Nonionic or Anionic Surfactant>

The function-imparting agent within the third surface conditioner of the present invention is a nonionic or anionic surfactant. By including a nonionic or anionic surfactant, a chemical conversion coating can be formed more favorably on an aluminum-based substrate at contact portions where an iron or zinc-based substrate and the aluminum-based substrate make contact, and the difference in the chemical conversion coating quantity formed on the general portions and the contact portions can be reduced. Furthermore, a dense chemical conversion coating can be formed on all manner of metal materials. Moreover, chemical conversion coatings with a satisfactory coating quantity can also be formed on aluminum-based substrates and high-tensile steel sheets. In terms of achieving the effects of the present invention more efficiently, the function-imparting agent within the third surface conditioner of the present invention is most preferably a nonionic surfactant.

Examples of the above nonionic surfactant include polyoxyethylene alkyl ethers, polyoxyalkylene alkyl ethers, polyoxyethylene derivatives, oxyethylene-oxypropylene block copolymers, sorbitan fatty acid esters, polyoxyethylene sorbitan fatty acid esters, polyoxyethylene sorbitol fatty acid esters, glycerol fatty acid esters, polyoxyethylene fatty acid esters, polyoxyethylene alkylamines, alkylalkanolamides, nonylphenol, alkylnonylphenols, polyoxyalkylene glycols, alkylamine oxides, acetylene diol, polyoxyethylene nonyl phenyl ethers, silicone-based surfactants such as polyoxyethylene alkyl phenyl ether-modified silicones, and fluorine-based surfactants in which at least one hydrogen atom in a hydrophobic group of a hydrocarbon-based surfactant has been substituted with a fluorine atom. Of these, in terms of maximizing the effects of the present invention, polyoxyethylene alkyl ethers and polyoxyalkylene alkyl ethers are preferred. These surfactants may be used either alone, or in combinations of two or more different compounds.

Examples of the above anionic surfactant include fatty acid salts, alkyl sulfate salts, alkyl ether sulfate salts, alkylbenzene sulfonic acid salts, alkylnaphthalene sulfonic acid salts, alkylsulfosuccinic acid salts, alkyldiphenylether disulfonic acid salts, polybisphenol sulfonic acid salts, alkyl phosphoric acid salts, polyoxyethyl alkyl sulfate salts, polyoxyethyl alkylallyl sulfate salt, alpha-olefin sulfonic acid salts, methyltaurine acid salts, polyasparagine acid salts, ether carboxylic acid salts, naphthalenesulfonic acid formalin condensates, polyoxyethylene alkyl phosphates, and alkyl ether phosphate salts. Of these, in terms of maximizing the effects of the present invention alkyl ether phosphate salts are particularly desirable. These surfactants may be used either alone, or in combinations of two or more different compounds.

The anionic surfactant described above can be used following neutralization with ammonia or an amine-based neutralizing agent. Examples of these amine-based neutralizing agents include diethylamine (DEA), triethylamine (TEA), monoethanolamine (META), diethanolamine (DETA), triethanolamine (TETA), dimethylethanolamine (DMEA), diethylethanolamine (DEEA), isopropylethanolamine (IPEA), diisopropanolamine (DIPA), 2-amino-2-methylpropanol (AMP), 2-(dimethylamino)-2-methylpropanol (DMAMP), morpholine (MOR), N-methylmorpholine (NMM) and N-ethylmorpholine (NEM). Of these, the use of 2-amino-2-methylpropanol (AMP) is preferred. These neutralizing agents may be used either alone, or in combinations of two or more different compounds.

In the surface conditioner, the quantity of the nonionic or anionic surfactant described above preferably has a lower limit of 3 ppm and an upper limit of 500 ppm. Provided the quantity falls within this range, the effects of the present invention can be favorably achieved. The lower limit is even more preferably 5 ppm, and the upper limit is even more preferably 300 ppm.

The aforementioned nonionic surfactant preferably has an HLB value of 6 or greater. This enables the effects of the present invention to be favorably achieved. The lower limit is even more preferably 7, and the upper limit is preferably 15. This HLB value represents the degree of affinity of the surfactant relative to water and oil. In the present invention, the HLB value is calculated on the basis of the general formula shown below (Griffin's method).

$$HLB = 20 \times (Mw/M)$$

(Mw: the weight of the hydrophilic group portion, M: the surfactant molecular weight)

Other Components

Besides the components described above, the surface conditioner of the present invention may also include a dispersion medium for dispersing the zinc phosphate particles. Examples of the dispersion medium include aqueous media containing at least 80% by mass of water, and although all manner of organic solvents can be used as the solvent other than water, the quantity of such organic solvents is preferably kept at a low level, and is preferably not more than 10% by mass, and even more preferably not more than 5% by mass of the aqueous medium. In the present invention, the dispersion may contain no dispersion media other than water.

In order to further stabilize the zinc phosphate particles, and enable the formation of an fine chemical conversion coating in the subsequent phosphate chemical conversion treatment step, an alkali salt such as soda ash may also be added.

If required, the surface conditioner of the present invention may also include conventional thickeners, polymer dispersants, or coupling agents or the like.

pH

The pH of the surface conditioner of the present invention has a lower limit of 3 and an upper limit of 12. If the pH is less than 3, then the zinc phosphate particles dissolve more readily, are more unstable, and may adversely effect the subsequent steps. If the pH exceeds 12, the pH in the chemical conversion bath in the subsequent step tends to rise, which may cause conversion coating defects. The pH values in the first and the third surface conditioners of the present invention preferably have a lower limit of 6 and an upper limit of 11.

The pH in the second surface conditioner of the present invention has a lower limit of 8 and an upper limit of 11. Provided the pH is within this range, the effects of the present invention described above can be achieved. If the pH is less than 8, then the [H+] concentration within the aqueous solution may rise, which may rob the particle surfaces of their negative charge and make it difficult to maintain the zeta potential at a value of −50 mV or lower. If the pH exceeds 11, then the pH in the chemical conversion bath in the subsequent step may tend to rise. The lower limit is even more preferably 8.5, and the upper limit is even more preferably 10.5.

Production Method

The surface conditioner of the present invention can be produced, for example, using the method described below.

The aforementioned zinc phosphate particles can be obtained by using, for example, zinc phosphate as a raw material. This raw material zinc phosphate is represented by the formula $Zn_3(PO_4)_2 \cdot 4H_2O$, and is generally a colorless crystalline solid, although a white powdered form is also available as a commercial product.

In one example of a method for producing the above raw material zinc phosphate, zinc sulfate is mixed with a disodium hydrogen phosphate diluent in a molar ratio of 3:2 and then heated, yielding zinc phosphate tetrahydrate as a crystalline precipitate. Furthermore, zinc phosphate tetrahydrate can also be obtained by reacting a dilute aqueous solution of phosphoric acid with zinc oxide or zinc carbonate. The tetrahydrate crystals are a rhombic system that has three different forms. When the crystals are heated, they become a dihydrate at 100° C., a monohydrate at 190° C., and an anhydride at 250° C. The zinc phosphate in the present invention can use any of these tetrahydrate, dihydrate, monohydrate or anhydride forms, but use of the readily available tetrahydrate form without further modification is adequate.

Substances that have been subjected to various surface treatments may also be used as the above raw material zinc phosphate. Examples include zinc phosphate that has been surface treated with a silane coupling agent, rosin, silicone compound, or a metal alkoxide such as a silicon alkoxide or aluminum alkoxide.

It is known that fine particles of zinc phosphate can be obtained by adding silica and polyphosphoric acid during reaction of a zinc compound with phosphoric acid (for example, see Japanese Examined Patent Publication No. S49-2005), and that a portion of the zinc in zinc phosphate can be substituted with metals such as magnesium, calcium and aluminum by wet-kneading zinc phosphate and various metal compounds using a mechanical technique, and then completing the reaction mechanochemically (for example, see Japanese Patent Laid-Open No. H04-310511), and zinc phosphate in which components other than phosphorus, oxygen and zinc, such as silica, calcium and aluminum, have been introduced using these techniques, or substances that are commercially available as silicic acid-modified zinc phosphate may also be used. In such cases, the zinc phosphate is preferably included in an equivalent quantity of ZnO of at least 25% by mass, and an equivalent quantity of $P_2O_5$ of at least 15% by mass.

There are no particular restrictions on the form of the above raw material zinc phosphate, and any form of zinc phosphate may be used. Commercially available products are typically available as white powders, but the powder may be in the form of fine particles, platelets or flakes or the like. Although there are no particular restrictions on the particle size of the raw material zinc phosphate, the average particle size is typically in the order of several p.m. Products that are available commercially as rust prevention pigments, in which the buffering action of the zinc phosphate has been enhanced by conducting a treatment that imparts basic properties, are particularly favorable. As described below, the present invention enables the preparation of a stable dispersion containing finely dispersed particles of zinc phosphate, and consequently a stable surface treatment effect can be achieved regardless of the primary particle size or the form of the raw material zinc phosphate.

The raw material zinc phosphate is preferably dispersed finely prior to use by converting the particles to a dispersion form. Although there are no particular restrictions on the method used for preparing the aqueous dispersion comprising the zinc phosphate particles dispersed within an aqueous medium, a preferred method involves adding the raw material zinc phosphate to an aforementioned dispersion medium that is water or an organic solvent or the like, and then conducting wet milling in the presence of the aforementioned water-soluble organic polymer (B). In those cases where a surface conditioner is prepared containing zinc oxide particles as a function-imparting agent (D), the zinc oxide is preferably also dispersed at the same time as the zinc phosphate. When preparing an aqueous dispersion of the zinc phosphate particles, it is preferred from a process perspective that the raw material zinc phosphate is added to the aqueous medium and then subjected to wet milling during the dispersion preparation, but the aqueous dispersion may also be prepared by conducting the wet milling in a dispersion medium other than the aqueous medium, and then conducting a solvent substitution.

In the preparation of the above aqueous dispersion, the blend quantity of the raw material zinc phosphate within 100% by mass of the resulting dispersion preferably has a lower limit of 0.5% by mass and an upper limit of 50% by mass. If this blend quantity is less than 0.5% by mass, then because the quantity of zinc phosphate is too small, the effects of the surface conditioner obtained using the dispersion may not manifest adequately. If the blend quantity exceeds 50% by mass, then achieving a uniform and fine particle size distribution may become problematic, and forming a state of fine dispersion may also be difficult. The lower limit is even more preferably 1% by mass, and the upper limit is even more preferably 40% by mass.

Furthermore, in the preparation of the above aqueous dispersion, the quantity added of the water-soluble organic polymer (B) relative to 100% by mass of the resulting dispersion preferably has a lower limit of 0.1% by mass and an upper limit of 50% by mass. If this quantity is less than 0.1% by mass, then the dispersibility may be unsatisfactory. If this quantity exceeds 50% by mass, then interaction between the excess molecules of the water-soluble organic polymer (B) may cause a deterioration in the dispersibility, and even if satisfactory dispersibility is achieved, the dispersion is economically unviable. The lower limit is even more preferably 0.5% by mass, and the upper limit is even more preferably 20% by mass.

Although there are no particular restrictions on the method used for obtaining a dispersion in which the aforementioned zinc phosphate particles are finely dispersed such that the $D_{50}$ value is not more than 3 μm, in a preferred method, from 0.5 to 50% by mass of the raw material zinc phosphate, and from 0.1 to 50% by mass of the above water-soluble organic polymer (B) are added to the dispersion medium, and wet milling is then conducted. There are no particular restrictions on the wet milling method, and conventional methods may be employed, including the use of disk-type and pin-type beads mills, and the use of medialess dispersers such as high-pressure homogenizers and ultrasonic dispersers.

During the above wet milling, by monitoring the $D_{90}$ value for the zinc phosphate particles, the phenomenon of excessive dispersion can be prevented, and other phenomena such as aggregation, viscosity increases, and aggregation between fine particles can also be prevented. In the present invention, the value of $D_{90}$ is preferably controlled so as to be not more than 4 μm. Furthermore, the blend quantities and dispersion conditions are preferably selected so that excessive dispersion does not occur.

Using the method for preparing an aqueous dispersion described above, the $D_{50}$ value for the zinc phosphate within the aqueous dispersion can be adjusted to a value of not more than 3 μm, and an aqueous dispersion can be obtained that exhibits excellent stability and superior performance as a surface conditioner. The $D_{50}$ value can typically be adjusted as desired within a range from 0.01 to 3 μm.

By preparing an aqueous dispersion using the method for preparing an aqueous dispersion described above, a dispersion in which the $D_{50}$ value within the medium is not more than 3 μm can be achieved even if the zinc phosphate has a particle size exceeding 3 μm. This also applies to zinc phosphate that has a primary particle size of several tens of μm. This means that even if a zinc phosphate with a small primary particle size is not used, by conducting wet milling in accordance with the method described above, the primary particle size of the pigment can be reduced. By using the above method, the $D_{50}$ value for the zinc phosphate particles within the aqueous dispersion can be adjusted to a value of not more than 3 μm, and preferably not more than 1 μm, and even more preferably not more than 0.2 μm.

In the dispersion obtained in the manner described above, the value of $D_{50}$ for the zinc phosphate particles within the dispersion can be adjusted to a value that is most suited to the particular application and is not more than 3 μm, enabling the preparation of an aqueous dispersion with excellent dispersion stability and superior performance as a surface conditioner.

Because the wet milling method described above is able to reduce the proportion of coarse particles represented by those particles with a particle size that exceeds $D_{90}$, a dispersion can be obtained that exhibits a sharp particle size distribution with a reduced proportion of coarse particles, in which the $D_{90}$ value is not more than 4 μm, even more preferably not more than 2.6 μm, and most preferably not more than 0.3 μm. As a result, it is surmised that the zinc phosphate is dispersed at fine dispersion sizes, and the dispersion state is extremely stable. Furthermore, it is also thought that because the proportion of coarse particles is low, the zinc phosphate within the liquid contributes more efficiently to the generation of crystal nuclei, and that because the particle size distribution is sharp with a uniform particle size, more uniform crystal nuclei are formed during the surface conditioning treatment step, which enables the formation of more uniform zinc phosphate crystals in the subsequent chemical conversion treatment, thereby yielding a more uniform surface state for the conversion treated steel sheet, and also meaning that the treatment properties can be improved for pocket-like portions within members having complicated structures, or for steel sheets such as black coated steel that are considered difficult to coat using chemical conversion treatments.

The $D_{50}$ and $D_{90}$ values for the zinc phosphate within the dispersion can be determined by conducting a particle size distribution measurement using a Laser Doppler particle size analyzer.

With the above aqueous dispersion, high-concentration aqueous dispersions containing at least 10% by mass, and preferably at least 20% by mass, and even more preferably 30% by mass or higher of the zinc phosphate can also be obtained. As a result, surface conditioners that exhibit excellent performance can be prepared with relative ease.

The surface conditioner of the present invention can be prepared, for example, by mixing an aqueous dispersion comprising the zinc phosphate particles (A) for which $D_{50}$ is not more than 3 μm and the water-soluble organic polymer (B), with the laminar clay mineral (C), the function-imparting agent (D), and any other components. There are no particular restrictions on the method used for this mixing, and for example, the other components may simply be added to the aqueous dispersion, or other components may also be included during the preparation of the aqueous dispersion.

Surface Conditioning Method

The surface conditioning method of the present invention comprises a step of bringing the above surface conditioner into contact with a metal surface. This enables fine particles of zinc phosphate to bond favorably to iron-based, zinc-based or aluminum-based metal surfaces, meaning a favorable chemical conversion coating can be formed in a chemical conversion treatment step.

In the surface conditioning method of the present invention, if the aforementioned first surface conditioner is used, then rust can be prevented from occurring on a variety of metal materials following the surface conditioning treatment.

On the other hand, in the surface conditioning method of the present invention, if the aforementioned second and third surface conditioners are used, then a chemical conversion coating can be formed more favorably on an aluminum-based substrate at contact portions where an iron or zinc-based substrate and the aluminum-based substrate make contact, and the difference in the chemical conversion coating quantity formed on the general portions and the contact portions can be reduced. Furthermore, a dense chemical conversion coating can be formed on all manner of metal materials. Moreover, chemical conversion coatings with a satisfactory coating quantity can also be formed on aluminum-based substrates and high-tensile steel sheets.

There are no particular restrictions on the method used for bringing the surface conditioner into contact with a metal surface during the surface conditioning method of the present invention, and conventional methods such as immersion and spraying may be adopted.

There are no particular restrictions on the metal material subjected to the above surface conditioning, and any of the various materials typically subjected to phosphate chemical conversion treatment can be used, including iron-based substrates such as steel, galvanized substrates such as galvanized steel sheets, aluminum-based substrates such as aluminum and aluminum alloys, high-tensile steel sheets, and magnesium alloys and the like. Furthermore, the surface conditioning can also be applied favorably to contact portions between steel or a galvanized steel sheet, and aluminum or an aluminum alloy.

In the surface conditioning method of the present invention, in those cases where the third surface conditioner is used, the step described above preferably involves the adsorption of zinc phosphate equivalent to at least 3 mg/m$^2$ of Zn. If this adsorption quantity is at least 3 mg/m$^2$, then the aforementioned effects of the present invention can be realized even more favorably. The above step is even more preferably a step in which zinc phosphate equivalent to 3.5 to 20 mg/m$^2$ of Zn is adsorbed the metal surface.

Furthermore, the surface conditioner of the present invention can also be used in a combined degreasing and surface conditioning step. This enables the water washing step typically conducted following the degreasing step to be omitted. In such a combined degreasing and surface conditioning step, conventional inorganic alkali builders, organic builders or surfactants or the like may also be added to enhance the cleaning action. Furthermore, conventional chelating agents and condensed phosphates may also be added. In the above surface conditioning, there are no particular restrictions on the contact time between the surface conditioner and the metal surface, or the temperature of the surface conditioner, and the surface conditioning may be conducted under conventional conditions.

A phosphate chemical conversion treated steel sheet can be produced by conducting the above surface conditioning, and then performing a phosphate chemical conversion treatment.

There are no particular restrictions on the method used for conducting the phosphate chemical conversion treatment, and conventional methods such as immersion (dipping) treatments, spray treatments and electrolytic treatments can be used. A combination of a plurality of these treatments may also be used. There are also no particular restrictions on the deposited phosphate coating, provided it is a phosphate salt, and zinc phosphate, iron phosphate, manganese phosphate and zinc calcium phosphate and the like can be used without any particular restrictions. In the phosphate chemical conversion treatment, there are no particular restrictions on the contact time between the chemical conversion treatment agent and the metal surface, or the temperature of the chemical conversion treatment agent, and the conversion treatment can be conducted under conventional conditions.

A coated steel sheet can also be produced by applying an additional coating after completion of the above surface conditioning and chemical conversion treatments. This additional coating is typically applied using an electrodeposition method. There are no particular restrictions on the coating material used for the additional coating, and any of the various materials typically used for coating a phosphate chemical conversion treated steel sheet can be used, including epoxy melamine coating materials, cationic electrodeposition materials, polyester-based intermediate coating materials, and polyester-based top coating materials. Following the chemical conversion treatment, a conventional method is usually used in which, for example, the conversion treated metal material is washed prior to coating.

The first surface conditioner of the present invention is a surface conditioner with a pH of 3 to 12 that is used prior to phosphate chemical conversion treatment of a metal, and comprises zinc phosphate particles for which $D_{50}$ is not more than 3 μm, at least one water-soluble organic polymer selected from the group consisting of specific carboxylic acid group-containing copolymers, phosphate esters, polyester-based resins, phosphonic acid group-containing resins and polyamine-based resins, a laminar clay mineral, and a specific quantity of divalent or trivalent metal nitrite compound. As a result, when this surface conditioner is used to conduct surface conditioning of all manner of metal materials, rust can be prevented from occurring following the surface conditioning treatment, meaning a chemical conversion coating of superior performance can be obtained. Furthermore, the surface conditioner also exhibits excellent dispersion stability within the treatment bath.

The second surface conditioner of the present invention is a surface conditioner with a pH of 8 to 11 that comprises zinc phosphate particles for which $D_{50}$ is not more than 3 μm, a specific carboxylic acid group-containing copolymer, and a laminar clay mineral, wherein the surface conditioner has a zeta potential of not more than −50 mV, and is used prior to phosphate chemical conversion treatment of a metal. As a result, when this surface conditioner is used to conduct surface conditioning of a substrate that contains portions in which an iron or zinc-based substrate contacts an aluminum-based substrate, and the substrate is subsequently subjected to a chemical conversion treatment, a chemical conversion coating is able to be formed more favorably on the aluminum-based substrate at the contact portions, the difference in the chemical conversion coating quantity formed on the general portions and the contact portions can be reduced, and a more uniform chemical conversion coating can be formed within both the general portions and the contact portions. Furthermore, a dense chemical conversion coating can be formed on all manner of metal materials. Moreover, chemical conversion coatings with a satisfactory coating quantity can also be formed on aluminum-based substrates and high-tensile steel sheets. In addition, the surface conditioner also exhibits excellent dispersion stability within the treatment bath.

The third surface conditioner of the present invention is a surface conditioner with a pH of 3 to 12 that is used prior to phosphate chemical conversion treatment of a metal, and comprises zinc phosphate particles for which $D_{50}$ is not more than 3 μm, a specific carboxylic acid group-containing copolymer, a laminar clay mineral, and a nonionic or anionic surfactant. As a result, when this surface conditioner is used to conduct surface conditioning of a substrate that contains portions in which an iron or zinc-based substrate contacts an aluminum-based substrate, and the substrate is subsequently subjected to a chemical conversion treatment, a chemical conversion coating is able to be formed more favorably on the aluminum-based substrate at the contact portions, the difference in the chemical conversion coating quantity formed on the general portions and the contact portions can be reduced, and a more uniform chemical conversion coating can be formed within both the general portions and the contact portions. Furthermore, a dense chemical conversion coating can be formed on all manner of metal materials. Moreover, chemical conversion coatings with a satisfactory coating quantity can also be formed on aluminum-based substrates and high-tensile steel sheets. In addition, the surface conditioner also exhibits excellent dispersion stability within the treatment bath.

EFFECTS OF THE INVENTION

By adopting the configurations described above, the surface conditioner of the present invention is able to prevent rust from occurring following surface conditioning, enables the formation of a favorable chemical conversion coating, and also exhibits excellent dispersion stability. Furthermore, the surface conditioner enables a dense chemical conversion coating to be formed on a variety of metal materials. Moreover, when used on aluminum alloys or high-tensile steel sheets, the surface conditioner enables the formation of a satisfactory chemical conversion coating, exhibits excellent dispersion stability within the treatment bath, and suppresses electrolytic corrosion on the aluminum alloy during chemical conversion treatment.

DESCRIPTION OF THE REFERENCE SYMBOLS

Figure 1:
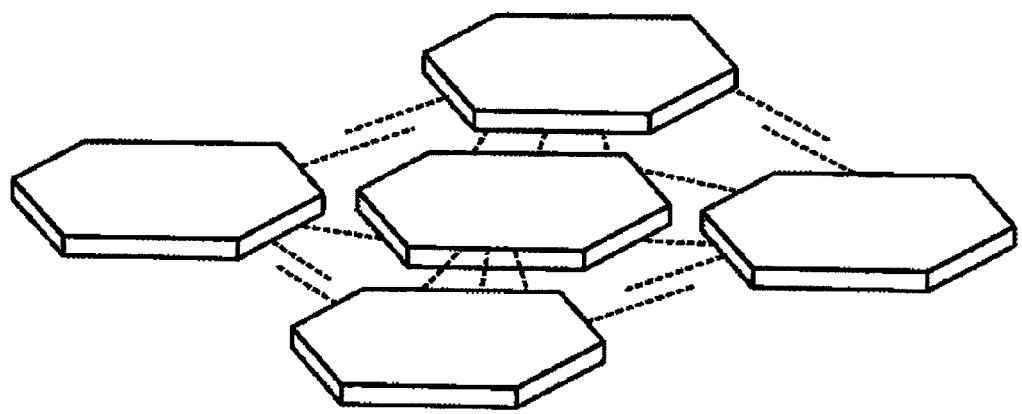
[FIG. 1] A pattern diagram of an alkyltrialkoxysilane-modified bentonite having a patchwork structure.

1 Electrolytic corrosion portion
2 Galvanized steel sheet
3 Aluminum sheet
4 General portion
5 Clip

BEST MODE FOR CARRYING OUT THE INVENTION

A more detailed description of the present invention is provided below based on a series of examples, although the present invention is not limited solely to these examples. In the examples, unless stated otherwise, "parts" and "%" refer to "parts by mass" and "% by mass" respectively.

Example A-1

Preparation of a Surface Conditioner Containing a Metal Nitrite Compound as a Function-Imparting Agent A synthetic hectorite "Laponite RD" (manufactured by Laporte Industries Ltd.) was added to water, and a pre-gel was obtained by stirring the mixture at 3,000 rpm for 30 minutes using a disper. To the resulting pre-gel were added a commercially available product "Phosphanol RS-610" (a polyoxyethylene alkyl phosphate, manufactured by Toho Chemical Industry Co., Ltd.) and zinc phosphate particles, and dispersion was then conducted using zirconia beads until a predetermined viscosity was reached. Calcium nitrite was added to the thus obtained dispersion, the mixture was diluted with water, and the pH was adjusted using sodium hydroxide, thus yielding a surface conditioner.

The quantities added of the synthetic hectorite, the polyoxyethylene alkyl phosphate, the zinc phosphate particles, the calcium nitrite and the sodium hydroxide, the pH value of the resulting surface conditioner, and the $D_{50}$ value for the zinc phosphate particles (the measurement method is described below) were as shown in Table 1.

[Measurement of Particle Size of Zinc Phosphate Particles]

The value for $D_{50}$ was measured by measuring the particle size distribution using a light diffraction-type particle size analyzer (LA-500, manufactured by Horiba, Ltd.), and monitoring the value of $D_{50}$.

Examples A-2 to A-5 and Comparative Examples A-1 to A-5

With the exceptions of altering the nature and the blend quantities of the laminar clay mineral, the water-soluble organic polymer, the zinc phosphate particles and the metal nitrite compound, and altering the pH of the resulting surface conditioner and the $D_{50}$ value of the zinc phosphate particles as shown in Table 1, surface conditioners were prepared in the same manner as the Example A-1.

The commercial products used are shown below.
Natural hectorite "BENTON EW" (manufactured by Elementis plc).
Alkyltrialkoxysilane surface-treated montmorillonite "Bengel-SH" (manufactured by Hojun Co., Ltd.).
Non-surface-treated montmorillonite "OPTIGEL CK" (manufactured by the Süd Chemie Group).
Carboxylic acid group-containing copolymer "Aron A6020" (acrylic acid: 40% by mass, 2-acrylamido-2-methylpropanesulfonic acid: 60% by mass, number average molecular weight: 3,800, weight average molecular weight: 6,700, manufactured by Toagosei Co., Ltd.).
Polyester-based resin "Disperbyk 190" (manufactured by BYK-Chemie GmbH).
Phosphonic acid group-containing resin "SN Dispersant 2060" (manufactured by San Nopco Ltd.).
Polyamine-based resin "KZ-125K" (manufactured by Senka Company).

In Table 1, the blend quantities listed for the metal nitrite compounds are expressed as equivalent quantities of $NO_2$.

Evaluation of Rust Occurrence Following Surface Conditioning

Cold-rolled steel sheets (SPC) (70 mm×150 mm×0.8 mm) that had already undergone a degreasing treatment were immersed for 2 minutes at room temperature in the surface conditioners obtained in the Examples and Comparative Examples, and were then shaken dry. The state of rust occurrence was evaluated on the basis of the proportion of rust spots on the coating. The results are shown in Table 1.

[Test Sheet Preparation]

Cold-rolled steel sheets (SPC) (70 mm×150 mm×0.8 mm), aluminum sheets (#6000) (70 mm×150 mm×0.8 mm) and galvanized steel sheets (GA) (70 mm×150 mm×0.8 mm) were each subjected to a degreasing treatment for 2 minutes at 40° C. using Surf Cleaner EC92 (a degreasing agent manufactured by Nippon Paint Co., Ltd.), and were subsequently subjected to a surface conditioning treatment for 30 seconds at room temperature using the surface conditioners obtained in the Examples and Comparative Examples. Subsequently, each of the metal sheets was subjected to a chemical conversion treatment for 2 minutes at 35° C., by immersion in a zinc phosphate treatment liquid (Surf Dyne SD6350, manufactured by Nippon Paint Co., Ltd.), and was then washed with water, washed with pure water, and then dried to yield a test sheet.

[Evaluation Tests]

Evaluations were conducted in the manner described below, and the results are shown in Table 1.

Chemical Conversion Properties of Zinc Phosphate Coating (Mass of Chemical Conversion Coating (C/W))

(1) Measurement of chemical conversion coating mass on SPC test sheet

The test sheet was immersed for 5 minutes in a 50 g/l solution of chromium trioxide that had been heated to 75° C., thereby peeling off the chemical conversion coating. The mass of the test sheet was deemed A (g), and the mass following peeling of the chemical conversion coating from the test sheet using the above method was deemed B (g), and the chemical conversion coating mass was then determined by dividing the difference between these two values (A−B) (g) by the surface area of the test sheet.

(2) Measurement of chemical conversion coating mass on aluminum test sheet and GA test sheet The chemical conversion coating mass was measured using an X-ray fluorescence measuring apparatus "XRF-1700" (manufactured by Shimadzu Corporation).

(3) Measurement of crystal size

The zinc phosphate chemical conversion coating on each test sheet was inspected using a scanning electron microscope (SEM) "JSM5600" (magnification: 1,500×). The crystal sizes determined on the basis of these observations are shown in Table 1.

TABLE 1

| | Zinc phosphate | Water-soluble organic polymer | Laminar clay mineral | Nitrite compound (as $NO_2$) | Particle size D50 | pH | Rust following surface conditioning | SPC | GA | AL |
|---|---|---|---|---|---|---|---|---|---|---|
| Example A-1 | 600 ppm | Phosphate ester Phosphanol RS-610 100 ppm | Hectorite Laponite RD 60 ppm | Calcium nitrite 100 ppm | 0.90 μm | 8.0 | No rust | 1.72 (2 to 3) | 3.43 (4) | 1.82 (3) |

TABLE 1-continued

| | Zinc phosphate | Water-soluble organic polymer | Laminar clay mineral | Nitrite compound (as NO$_2$) | Particle size D50 | pH | Rust following surface conditioning | SPC | GA | AL |
|---|---|---|---|---|---|---|---|---|---|---|
| Example A-2 | 600 ppm | Polyester-based resin Disperbyk 190 50 ppm | Hectorite BENTON EW 50 ppm | Calcium nitrite 10 ppm | 0.54 μm | 9.5 | No rust | 1.66 −2.00 | 2.46 (3) | 1.74 (2) |
| Example A-3 | 600 ppm | Acrylic 40/Sulfonic 60 Aron A-6020 100 ppm | Hectorite Laponite RD 100 ppm | Zinc nitrite 10 ppm | 1.41 μm | 9.5 | No rust | 1.78 (2 to 3) | 2.69 (3) | 1.28 (2) |
| Example A-4 | 600 ppm | Phosphonic acid resin SN Dispersant 2060 70 ppm | Montmorillonite Bengel SH 100 ppm | Zinc nitrite 250 ppm | 0.63 μm | 10.0 | No rust | 2.05 (3) | 3.12 (3 to 4) | 1.47 (3) |
| Example A-5 | 600 ppm | Polyamine-based resin KZ-125K 120 ppm | Montmorillonite OPTIGEL CK 100 ppm | Zinc nitrite 230 ppm | 0.52 μm | 7.0 | No rust | 2.01 (3) | 3.24 (3 to 4) | 1.01 (3 to 4) |
| Comparative Example A-1 | 600 ppm | Phosphate ester Phosphanol RS-610 100 ppm | Hectorite BENTON EW 60 ppm | Calcium nitrite 5 ppm | 0.84 μm | 8.0 | Rust spots over 5% of surface area | Rust spots | 3.54 (4) | 1.77 (3) |
| Comparative Example A-2 | 600 ppm | Phosphate ester Phosphanol RS-610 100 ppm | Hectorite BENTON EW 60 ppm | 0 ppm | 1.37 μm | 9.5 | Rust spots over 30% of surface area | Rust spots | 3.61 (4) | 1.80 (3) |
| Comparative Example A-3 | 600 ppm | Polyester-based resin Disperbyk 190 50 ppm | Hectorite Laponite RD 0 ppm | Calcium nitrite 50 ppm | 0.66 μm | 9.5 | Rust spots over 5% of surface area | Rust spots | 2.54 (3) | 1.45 (2 to 3) |
| Comparative Example A-4 | 600 ppm | Acrylic 40/Sulfonic 60 Aron A-6020 100 ppm | Montmorillonite Bengel SH 100 ppm | Zinc nitrite 8 ppm | 0.85 μm | 10 | Rust spots over 3% of surface area | Rust spots | 2.67 (3) | 1.24 (2) |
| Comparative Example A-5 | 600 ppm | Phosphonic acid resin SN Dispersant 2060 70 ppm | Montmorillonite OPTIGEL CK 50 ppm | Calcium nitrite 30 ppm | 4.7 μm | 7.0 | No rust | 3.03 (4) | 4.12 (5) | 0.55 (5) |

( ) Crystal size

In those cases where the first surface conditioner of the present invention was used, rust was able to be prevented from occurring following surface conditioning. Furthermore, the chemical conversion coatings formed on the cold-rolled steel sheets, aluminum sheets and galvanized steel sheets all showed satisfactory coating quantities, and were dense coatings in each case.

Example B-1

Preparation of a Surface Conditioner Containing Zinc Oxide and/or Sodium Hydroxide as a Function-Imparting Agent A natural hectorite "BENTON EW" (manufactured by Elementis plc) was added to water, and a pre-gel was obtained by stirring the mixture at 3,000 rpm for 30 minutes using a disper. To the resulting pre-gel were added a commercially available product "Aron A6020" (a carboxylic acid group-containing copolymer comprising 40% by mass of acrylic acid and 60% by mass of 2-acrylamido-2-methylpropanesulfonic acid, number average molecular weight: 3,800, weight average molecular weight: 6,700, manufactured by Toagosei Co., Ltd.), zinc phosphate particles and zinc oxide particles, and dispersion was then conducted using zirconia beads until a predetermined viscosity was reached. The thus obtained dispersion was diluted with water, and the pH was adjusted using sodium hydroxide, thus yielding a surface conditioner. The quantities added of the natural hectorite, the carboxylic acid group-containing copolymer, the zinc phosphate particles, the zinc oxide and the sodium hydroxide, the pH value of the resulting surface conditioner, and the $D_{50}$ value for the zinc phosphate particles were as shown in Table 2. The zeta potential of the obtained surface conditioner was measured using the measurement method described above. The thus obtained zeta potential value is shown in Table 2.

Examples B-2 to B-5 and Comparative Examples B-1 to B-6

With the exceptions of altering the blend quantities of the natural hectorite, the carboxylic acid group-containing copolymer, the zinc phosphate particles, the zinc oxide and the sodium hydroxide, and altering the pH of the resulting surface conditioner and the $D_{50}$ value of the zinc phosphate particles as shown in Table 2, surface conditioners were prepared in the same manner as the Example B-1. The zeta potentials of the obtained surface conditioners were also measured in the same manner, with the measured values shown in Table 2. In the case of the Comparative Examples B-1 to B-3, sodium carbonate was added as an alkali component.

Comparative Example B-7

Using a (Ti-based) surface conditioner "Surf Fine 5N-8" manufactured by Nippon Paint Co., Ltd., a surface conditioner was prepared by adding sufficient water to generate the desired concentration (a dilute liquid of 0.1% by mass).

[Test Sheet Preparation 1]

With the exception of adding a high-tensile steel sheet (70 mm×150 mm×1.0 mm), test sheet preparation was conducted in the same manner as that described above in the section entitled "Test Sheet Preparation" for the A series of Examples.

[Test Sheet Preparation 2]

A surface conditioner-treated aluminum sheet and galvanized steel sheet were prepared in the same manner as the "Test Sheet Preparation 1", and following completion of the surface conditioning treatments, the aluminum sheet and the galvanized steel sheet were connected together by clips. Subsequently, the connected sheets were subjected to a chemical conversion treatment, and were then washed with water, washed with pure water, and then dried to yield a test sheet, in the same manner as the "Test Sheet Preparation 1".

[Evaluation Tests]

Evaluations were conducted in the manner described below, and the results are shown in Table 2.

Chemical Conversion Properties of Zinc Phosphate Coating (Mass of Chemical Conversion Coating (C/W))

(1) Measurement of chemical conversion coating mass on SPC test sheet and high-tensile steel test sheet
(2) Measurement of chemical conversion coating mass on aluminum test sheet and GA test sheet These measurements were conducted in the same manner as the evaluation tests conducted for the A series of Examples.

Figure 2:
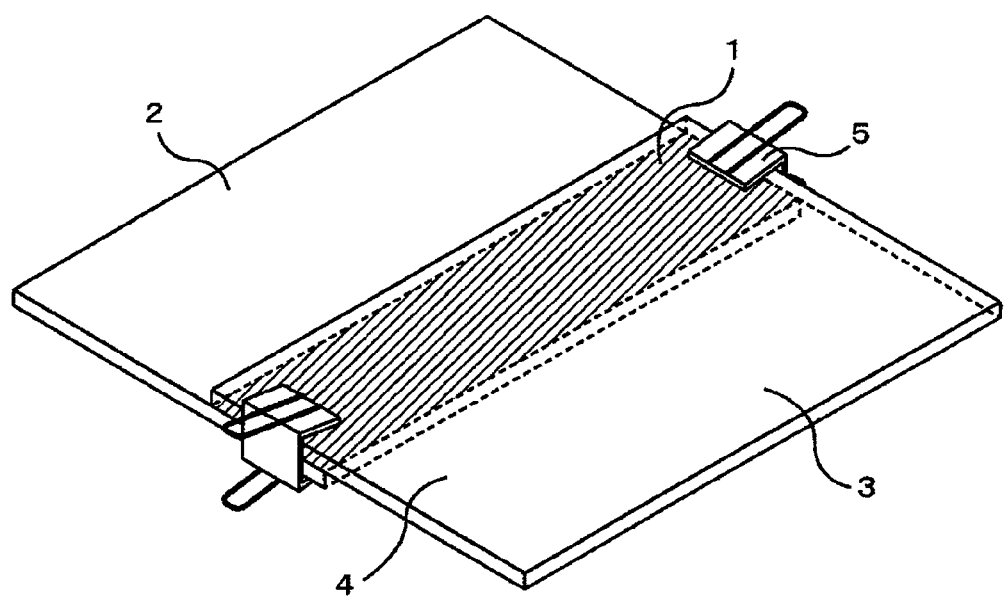
[FIG. 2] A schematic illustration of an electrolytic corrosion aluminum test sheet used in the examples.

(3) Measurement of chemical conversion coating mass on electrolytic corrosion aluminum test sheet The region where the aluminum test sheet contacted the galvanized steel sheet was deemed the electrolytic corrosion portion (the contact portion), and the region where the aluminum test sheet did not contact the galvanized steel sheet was deemed the general portion, and the chemical conversion coating mass within these portions was measured using an X-ray fluorescence measuring apparatus "XRF-1700" (manufactured by Shimadzu Corporation). A schematic illustration of the electrolytic corrosion aluminum test sheet is shown in FIG. 2.

(4) Chemical conversion coating mass ratio (AL ratio) between the corrosion portion (the contact portion) and the general portion This ratio was calculated as the value of the chemical conversion coating mass within the general portion/the chemical conversion coating mass within the electrolytic corrosion portion, using the measured values obtained above.

(5) Measurement of crystal size

This measurement was conducted in the same manner as the evaluation test conducted for the A series of Examples.

TABLE 2

| | Zinc phosphate (ppm) | Copolymer (ppm) | Hectorite (ppm) | NaOH (ppm) | ZnO (ppm) | Other alkali (ppm) | Particle size D50 (μm) |
|---|---|---|---|---|---|---|---|
| Example B-1 | 600 | 50 | 50 | 30 | 10 | 0 | 0.54 |
| Example B-2 | 600 | 50 | 50 | 10 | 0 | 0 | 0.53 |
| Example B-3 | 1000 | 100 | 50 | 0 | 10 | 0 | 0.8 |
| Example B-4 | 200 | 10 | 10 | 50 | 0 | 0 | 0.58 |
| Example B-5 | 600 | 50 | 50 | 30 | 10 | 0 | 2.43 |
| Comparative Example B-1 | 600 | 50 | 50 | 0 | 0 | $Na_2CO_3$ 30 | 0.55 |
| Comparative Example B-2 | 600 | 50 | 50 | 0 | 0 | $Na_2SiO_3$ 30 | 0.52 |
| Comparative Example B-3 | 600 | 50 | 0 | 0 | 0 | $Na_2CO_3$ 30 | 0.54 |
| Comparative Example B-4 | 600 | 0 | 50 | 30 | 0 | 0 | 0.51 |
| Comparative Example B-5 | 600 | 100 | 50 | 0 | 0 | 0 | 0.54 |
| Comparative Example B-6 | 600 | 100 | 50 | 2 | 0 | 0 | 0.54 |
| Comparative Example B-7 | Ti-based surface conditioner | | | | | | |

| | pH | Zeta potential (mV) | SPC | GA | AL General portion | AL Electrolytic corrosion portion | High-tensile | AL ratio |
|---|---|---|---|---|---|---|---|---|
| Example B-1 | 9.5 | −63 | 1.31 (1 to 2) | 2.01 (2 to 3) | 1.68 (2) | 1.65 (2) | 1.52 (1 to 2) | 1.02 |
| Example B-2 | 8.5 | −60 | 1.34 (1 to 2) | 2.06 (2 to 3) | 1.62 (2) | 1.60 (2) | 1.56 (1 to 2) | 1.01 |
| Example B-3 | 8.1 | −55 | 1.48 (1 to 2) | 2.26 (2 to 3) | 1.50 (2) | 1.44 (2) | 1.67 (1 to 2) | 1.04 |
| Example B-4 | 10.8 | −52 | 1.59 (1 to 2) | 2.12 (2 to 3) | 1.56 (2) | 1.50 (2) | 1.59 (1 to 2) | 1.04 |
| Example B-5 | 9.5 | −51 | 1.65 (2) | 2.33 (2 to 3) | 1.43 (2) | 1.37 (2) | 1.75 (1 to 2) | 1.04 |
| Comparative Example B-1 | 9.3 | −41 | 1.71 (2) | 2.42 (3) | 1.21 (3) | 1.14 (3) | 1.94 (2 to 3) | 1.06 |
| Comparative Example B-2 | 9.1 | −34 | 1.7 (2) | 2.46 (3) | 1.19 (3) | 1.09 (3) | 1.97 (2 to 3) | 1.09 |
| Comparative Example B-3 | 9.2 | −36 | 1.74 (2) | 2.34 (2 to 3) | 1.20 (3) | 1.01 (3) | 2.01 (2 to 3) | 1.19 |
| Comparative Example B-4 | 9.5 | −29 | 2.05 (3) | 3.68 (5) | 1.02 (4) | 0.87 (4) | some rust (2 to 3) | 1.17 |
| Comparative Example B-5 | 7.5 | −30 | 1.68 (2) | 2.37 (2 to 3) | 1.21 (3) | 1.03 (3) | 1.81 (2 to 3) | 1.17 |
| Comparative Example B-6 | 8.1 | −28 | 1.7 (2) | 2.45 (3) | 1.15 (3) | 1.01 (3) | 1.97 (2 to 3) | 1.14 |

TABLE 2-continued

| Comparative Example B-7 | 8.7 | −35 | 2.09 (3) | 3.97 (5) | 0.45 (5) | 0.32 (5) | some rust | 1.40 |

( ) Crystal size

In those cases where the second surface conditioner of the present invention was used, a chemical conversion coating was able to be formed satisfactorily on the aluminum sheet at the contact portions between the aluminum sheet and the galvanized steel sheet, and the difference in the chemical conversion coating quantity formed on the general portions and the contact portions was minimal. Furthermore, a dense chemical conversion coating was formed on all the sheets, namely the cold-rolled steel sheet, aluminum sheet, galvanized steel sheet and high-tensile steel sheet.

Example C-1

Preparation of a Surface Conditioner Containing a Nonionic or Anionic Surfactant as a Function-Imparting Agent A natural hectorite "BENTON EW" (manufactured by Elementis plc) was added to water, and a pre-gel was obtained by stirring the mixture at 3,000 rpm for 30 minutes using a disper. To the resulting pre-gel were added a commercially available product "Aron A6020" (a carboxylic acid group-containing copolymer comprising 40% by mass of acrylic acid and 60% by mass of 2-acrylamido-2-methylpropane-sulfonic acid, number average molecular weight: 3,800, weight average molecular weight: 6,700, manufactured by Toagosei Co., Ltd.) and zinc phosphate particles, and dispersion was then conducted using zirconia beads until a predetermined viscosity was reached. A surfactant "Adekatol SO-135" (a synthetic alcohol-based ethylene oxide, propylene oxide adduct, manufactured by Asahi Denka Co., Ltd.) was added to the thus obtained dispersion, the mixture was diluted with water, and the pH was adjusted using sodium hydroxide, thus yielding a surface conditioner.

The nature and quantities added of the natural hectorite, the carboxylic acid group-containing copolymer, the zinc phosphate particles, the surfactant and the sodium hydroxide, the pH value of the resulting surface conditioner, and the $D_{50}$ value for the zinc phosphate particles were as shown in Table 3.

Examples C-2 to C-5 and Comparative Examples C-1 to C-4

With the exceptions of altering the blend quantities of the natural hectorite, the carboxylic acid group-containing copolymer, the zinc phosphate particles and the surfactant, and altering the pH of the resulting surface conditioner and the $D_{50}$ value of the zinc phosphate particles as shown in Table 3, surface conditioners were prepared in the same manner as the Example C-1.

The commercially available surfactants used are shown below.

"Newcol 564" (a synthetic alcohol-based ethylene oxide, propylene oxide adduct, manufactured by Nippon Nyukazai Co., Ltd.)

"Adekatol LA-765B" (a natural alcohol-based ethylene oxide, propylene oxide adduct, manufactured by Asahi Denka Co., Ltd.)

"Adekanol B-4009" (a special polyether-based ethylene oxide, propylene oxide adduct, manufactured by Asahi Denka Co., Ltd.)

"Newcol 1120-PS" (an alkyl ether phosphate, manufactured by Nippon Nyukazai Co., Ltd.)

"Adekamine SF-101" (a cationic surfactant, manufactured by Asahi Denka Co., Ltd.)

[Test Sheet Preparation 1]
[Test Sheet Preparation 2]

Test sheet preparation was conducted based on the method used for preparation of the test sheets for the A series of Examples and the B series of Examples respectively.

[Evaluation Tests]

Evaluations were conducted in the manner described below, and the results are shown in Table 3.

Chemical Conversion Properties of Zinc Phosphate Coating (Mass of Chemical Conversion Coating (C/W))

(1) Measurement of chemical conversion coating mass on SPC test sheet and high-tensile steel test sheet
(2) Measurement of chemical conversion coating mass on aluminum test sheet and GA test sheet
(3) Measurement of chemical conversion coating mass on electrolytic corrosion aluminum test sheet
(4) Chemical conversion coating mass ratio (AL ratio) between the corrosion portion (the contact portion) and the general portion
(5) Measurement of crystal size These measurements were conducted in the same manner as the evaluation tests conducted for the A series and B series of Examples.

(6) Adsorption quantity as Zn

Following immersion in the surface conditioning treatment bath, the sheet was dried at 50° C. and then measured using an X-ray fluorescence measuring apparatus "XRF-1700" (manufactured by Shimadzu Corporation).

TABLE 3

| | Zinc phosphate (ppm) | Copolymer (ppm) | Hectorite (ppm) | Surfactant | | | Particle size D50 (μm) |
|---|---|---|---|---|---|---|---|
| Example C-1 | 600 | 50 | 50 | Synthetic alcohol-based EO, PO adduct (Adekatol SO-135) | HLB 13.5 | 30 ppm | 0.52 |
| Example C-2 | 600 | 50 | 50 | Synthetic alcohol-based EO, PO adduct (Newcol 564) | HLB 12.3 | 5 ppm | 0.54 |

TABLE 3-continued

| | | | | | | | |
|---|---|---|---|---|---|---|---|
| Example C-3 | 600 | 100 | 50 | Natural alcohol-based EO, PO adduct (Adekatol LA-765B) | HLB 11.9 | 10 ppm | 0.51 |
| Example C-4 | 600 | 50 | 50 | Special polyether-based EO, PO adduct (Adekanol B-4009) | | 50 ppm | 2.46 |
| Example C-5 | 600 | 10 | 50 | Alkyl ether phosphate (Newcol 1120-PS) | | 20 ppm | 0.84 |
| Comparative Example C-1 | 600 | 50 | 50 | None | | 0 ppm | 0.55 |
| Comparative Example C-2 | 600 | 0 | 50 | Synthetic alcohol-based EO, PO adduct (Newcol 564) | HLB 12.3 | 30 ppm | 0.56 |
| Comparative Example C-3 | 600 | 50 | 0 | ↑ | HLB 12.3 | 30 ppm | 0.58 |
| Comparative Example C-4 | 600 | 50 | 50 | Cationic surfactant (Adekamine SF-101) | | 30 ppm | 0.57 |

| | pH | Adsorption quantity (Zn) (mg/m²) | SPC | GA | AL General portion | AL Electrolytic corrosion portion | High-tensile | AL ratio |
|---|---|---|---|---|---|---|---|---|
| Example C-1 | 9.5 | 10.2 | 1.32 (1 to 2) | 2.02 (2 to 3) | 1.56 (2) | 1.53 (2) | 1.54 (1 to 2) | 1.02 |
| Example C-2 | 10.0 | 8.6 | 1.45 (1 to 2) | 2.21 (2 to 3) | 1.42 (2) | 1.36 (2) | 1.64 (1 to 2) | 1.04 |
| Example C-3 | 9.0 | 9.5 | 1.37 (1 to 2) | 2.19 (2 to 3) | 1.48 (2) | 1.41 (2) | 1.59 (1 to 2) | 1.05 |
| Example C-4 | 8.5 | 9.7 | 1.35 (1 to 2) | 2.17 (2 to 3) | 1.50 (2) | 1.45 (2) | 1.58 (1 to 2) | 1.03 |
| Example C-5 | 9.5 | 4.1 | 1.63 (1 to 2) | 2.29 (2 to 3) | 1.36 (2) | 1.30 (2) | 1.78 (1 to 2) | 1.05 |
| Comparative Example C-1 | 9.5 | 2.4 | 1.78 (2 to 3) | 2.53 (4) | 1.21 (3) | 1.10 (3) | 2.03 (3) | 1.09 |
| Comparative Example C-2 | 10.0 | 1.9 | 2.03 (3) | 3.72 (4) | 1.04 (5) | 0.86 (5) | some rust | 1.21 |
| Comparative Example C-3 | 8.5 | 2.8 | 1.79 (2 to 3) | 2.67 (4) | 1.21 (4) | 1.02 (4) | 2.14 (3) | 1.19 |
| Comparative Example C-4 | 10.0 | 0.9 | 2.86 (4) | 4.06 (5) | 0.65 (5) | 0.22 (5) | some rust | 2.95 |

( ) Crystal size

In those cases where the third surface conditioner of the present invention was used, a chemical conversion coating was able to be formed satisfactorily on the aluminum sheet at the contact portions between the aluminum sheet and the galvanized steel sheet, and the difference in the chemical conversion coating quantity formed on the general portions and the contact portions was minimal. Furthermore, a dense chemical conversion coating was formed on all the sheets, namely the cold-rolled steel sheet, aluminum sheet, galvanized steel sheet and high-tensile steel sheet. It is thought that this observation reflects the fact that the Zn adsorption quantity was able to be increased during the surface conditioning.

INDUSTRIAL APPLICABILITY

The surface conditioner of the present invention can be used favorably on all manner of metal materials used within automotive bodies and household electrical appliances and the like.

The invention claimed is:

1. A surface conditioner having a pH of 3 to 12 that is used prior to phosphate conversion coating of a metal, the surface conditioner comprising:
(A) zinc phosphate particles for which $D_{50}$ is not more than 3 μm,
(B) a water-soluble organic polymer,
(C) a laminar clay mineral, and
(D) a function-imparting agent, wherein the function-imparting agent is selected from the group consisting of (a) a zeta potential modifier, (b) a nonionic surfactant having an HLB value of 6 or greater, and (c) a divalent or trivalent metal nitrite compound, in which a quantity of the metal nitrite compound, calculated as an equivalent quantity of $NO_2$, is within a range from 10 to 500 ppm.

2. The surface conditioner according to claim 1, wherein the water-soluble organic polymer (B) is at least one polymer selected from the group consisting of:
(1) carboxylic acid group-containing copolymers obtainable by copolymerizing a monomer mixture comprising less than 50% by mass of at least one carboxylic acid group-containing monomer selected from the group consisting of (meth)acrylic acid, maleic acid, maleic anhydride, itaconic acid and itaconic anhydride, and greater than 50% by mass of another monomer that is capable of copolymerization with the carboxylic acid group-containing monomer,
(2) phosphate esters represented by either a formula (I) shown below:

[Formula 1]

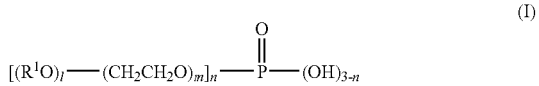

(wherein, $R^1$ represents an alkyl group or alkylphenol group of 8 to 30 carbon atoms, l represents either 0 or 1, m is from 1 to 20, and n represents 1, 2 or 3), or a formula (II) shown below:

[Formula 2]

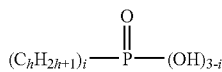
(II)

(wherein, h represents an integer from 2 to 24, and i represents either 1 or 2),
- (3) polyester resins,
- (4) phosphonic acid group-containing resins, and
- (5) polyamine-based resins, and the function-imparting agent (D) is a divalent or trivalent metal nitrite compound, in which a quantity of the metal nitrite compound, calculated as an equivalent quantity of $NO_2$, is within a range from 10 to 500 ppm.

3. A surface conditioner according to claim 1, wherein the water-soluble organic polymer (B) is a carboxylic acid group-containing copolymer obtainable by copolymerizing a monomer mixture comprising less than 50% by mass of at least one carboxylic acid group-containing monomer selected from the group consisting of (meth)acrylic acid, maleic acid, maleic anhydride, itaconic acid and itaconic anhydride, and greater than 50% by mass of another monomer that is capable of copolymerization with the carboxylic acid group-containing monomer,
wherein the zeta potential modifier is zinc oxide and/or sodium hydroxide,
a zeta potential is not more than −50 mV, and
a pH is within a range from 8 to 11.

4. The surface conditioner according to claim 2, wherein the monomer that is capable of copolymerization with the carboxylic acid group-containing monomer comprises a sulfonic acid monomer and/or styrene.

5. The surface conditioner according to claim 2, wherein the carboxylic acid group-containing copolymer is obtainable by copolymerizing a monomer mixture comprising less than 50% by mass of (meth)acrylic acid, and more than 50% by mass of a combined mass of 2-(meth)acrylamido-2-methylpropanesulfonic acid and/or allylsulfonic acid.

6. The surface conditioner according to claim 1, wherein the laminar clay mineral is a natural hectorite and/or a synthetic hectorite.

7. The surface conditioner according to claim 1, wherein the laminar clay mineral is a material obtained by surface treating bentonite with an alkyltrialkoxysilane represented by a formula (III) shown below:

[Formula 3]

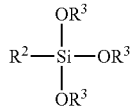
(III)

(wherein, $R^2$ represents a saturated alkyl group of 1 to 22 carbon atoms, and $R^3$ groups may be identical or different, and each represent a methyl group, ethyl group, propyl group or butyl group).

8. The surface conditioner according to claim 2, wherein a weight average molecular weight of the phosphonic acid group-containing resin is within a range from 3,000 to 20,000.

9. A surface conditioning method, comprising bringing the surface conditioner according to claim 1 into contact with a metal surface.

10. A surface conditioning method, comprising a step of bringing the surface conditioner according to claim 1 into contact with a metal surface, wherein the step comprises adsorbing zinc phosphate equivalent to at least 3 mg/m² of Zn.

* * * * *